US008676815B2

(12) United States Patent
Deng et al.

(10) Patent No.: US 8,676,815 B2
(45) Date of Patent: Mar. 18, 2014

(54) SUFFIX TREE SIMILARITY MEASURE FOR DOCUMENT CLUSTERING

(75) Inventors: Xiaotie Deng, Hong Kong (CN); Hung Chim, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 167 days.

(21) Appl. No.: 12/436,722

(22) Filed: May 6, 2009

(65) Prior Publication Data

US 2009/0307213 A1     Dec. 10, 2009

Related U.S. Application Data

(60) Provisional application No. 61/051,151, filed on May 7, 2008.

(51) Int. Cl.
    *G06F 17/30*     (2006.01)
(52) U.S. Cl.
    USPC ........................................................ 707/749
(58) Field of Classification Search
    USPC ............ 707/749, 776, 758, E17.046, E17.05, 707/E17.051, E17.087, E17.089, 999.007
    See application file for complete search history.

(56) References Cited

U.S. PATENT DOCUMENTS

| | | | | |
|---|---|---|---|---|
| 4,794,528 | A * | 12/1988 | Hirose et al. | 1/1 |
| 6,098,034 | A * | 8/2000 | Razin et al. | 704/9 |
| 7,676,463 | B2 * | 3/2010 | Thompson et al. | 707/999.005 |
| 2002/0073132 | A1 * | 6/2002 | Van Garderen et al. | 709/102 |
| 2002/0120619 | A1 * | 8/2002 | Marso et al. | 707/3 |
| 2005/0165732 | A1 * | 7/2005 | Burges | 707/1 |
| 2005/0267871 | A1 * | 12/2005 | Marchisio et al. | 707/3 |
| 2008/0109437 | A1 * | 5/2008 | Perrizo et al. | 707/7 |
| 2008/0294651 | A1 * | 11/2008 | Masuyama et al. | 707/100 |

OTHER PUBLICATIONS

Chuang et al. "A Practical Web-based Approach to Generating Topic Hierarchy for Text Segments." CIKM '04, Nov. 8-13, 2004. [Retrieved on Apr. 1, 2011]. Retrieved from the Internnet: <URL: http://portal.acm.org/citation.cfm?id=1031193>.*
Hammouda et al. "Efficient Phrase-Based Document Indexing for Web Document Clustering." Knowledge and Data Engineering, IEEE Transactions, Oct. 2004. [Retrieved on Apr. 1, 2011]. Retrieved from the Internnet: <URL: http://ieeexplore.ieee.org/xpls/abs_all.jsp?arnumber=1324634&tag=1>.*
Salton et al. "Term-Weighting Approaches in Automatic Text Retrieval." Information Processing & Management vol. 24, No. 5, pp. 513-523, 1998.*
Elkan, Deriving TF-IDF as a Fisher Kernel, 2005, SPIRE 2005, LNCS 3772, pp. 296-301, 2005.*
Joachims, A Probabilistic Analysis of the Rocchio Algorithm with TFIDF for Text Categorization, 1996, pp. 1-9.*

(Continued)

*Primary Examiner* — Ajay Bhatia
*Assistant Examiner* — Randall Burns
(74) *Attorney, Agent, or Firm* — Turocy & Watson, LLP

(57) ABSTRACT

The subject innovation provides for systems and methods to facilitate weighted suffix tree clustering. Conventional suffix tree cluster models can be augmented by incorporating quality measures to facilitate improved performance. Further the quality measure can be employed in determining cluster labels that show improvements in accuracy over conventional means. Additionally "stopnodes" can be defined to facilitate traversing suffix tree models efficiently. Quality measurements can be determined based in part on weighting factors applied to terms in a vector model, said terms being mapped from a suffix tree model.

20 Claims, 19 Drawing Sheets

(56) References Cited

OTHER PUBLICATIONS

"The Suffix Tree Document Model Revisited", Eissen, Proceeding of I-Know '05, Jul. 1, 2005 pp. 1-8.*

Hung Chim, Xiaotie Deng, A New Suffix Tree Similarity Measure for Document Clustering, Proceedings of the 16th International World Wide Web Conference, May 8-12, 2007, pp. 121-130, Alberta, Canada.

Baeza-Yates, et al., "Modern Information Retrieval." Addison Wesley, 1999, 38 pages.

Zamir, et al., "Grouper: a dynamic clustering interface to Web search results." Computer Networks (Amsterdam, Netherlands: 1999), 31(11-16):1361-1374, 1999, 15 pages.

Zamir, et al., "Web document clustering: A feasibility demonstration." In Proceedings of SIGIR'98, University of Washington, Seattle, USA, 1998, 9 pages.

Lewis, et al., "RCV1: A new benchmark collection for text categorization research." Journal of Machine Learning Research, 5:361-397, 2004, 37 pages.

Yamamoto, et al, "Using suffix arrays to compute term frequency and document frequency for all substrings in a corpus." Computational Linguistics, 27(1):1-30, 2001, 30 pages.

Giegerich, et al., "From Ukkonen to McCreight and Weiner: A unifying view of linear-time suffix tree construction." Algorithmica, 19(3):331-353, 1997, 24 pages.

Hammouda, et al., "Efficient phrase-based document indexing for web document clustering." IEEE Transactions on Knowledge and Data Engineering, 16(10):1279-1296, 2004, 18 pages.

Chim, et al., "A semantics based information distribution framework for large web-based course forum system." Lecture Notes in Computer Science: Advances in Web Based Learning ICWL 2006, 4181/2006:93-104, 2006, 3 pages.

Hersh, et al., "Ohsumed: an interactive retrieval evaluation and new large test collection for research." In Proceedings of the 17th annual international ACM SIGIR conference on Research and development in information retrieval, pp. 192-201, Dublin, Ireland, 10 pages.

Larsen, et al., "Fast and effective text mining using linear-time document clustering." In Proceedings of the KDD-99 Workshop, San Diego, CA, USA, 7 pages.

Manber, et al., "Suffix arrays: a new method for on-line string searches." SIAM Journal on Computing, 22(5):935-948, 1993, 16 pages.

O'Neill, et al., "The collaboratory notebook: A distributed knowledge-building environment for project-enhanced learning." In Proceedings of Ed-Meida'94, Vancouver, BC, 1994, 8 pages.

Zamir, et al., "Fast and intuitive clustering of web documents." In Proceedings of the 3rd International Conference on Knowledge Discovery and Data Mining, 1997, 13 pages.

J. R. Paul Bieganski and J. V. Carlis. Generalized suffix trees for biological sequence data: Application and implentation. In Proceedings of 27th Annual Hawaii International Conference on System Sciences, pp. 35-44, 1994.

P. Willett. Recent trends in hierarchic document clustering: a critical review. Information Processing and Management, 24(5):577-597, 1988.

Allen, et al., "An interface for navigating clustered document sets returned by queries." In Proceedings of the ACM Conference on Organizational Computing Systems, pp. 166-171, 1993, 6 pages.

Pampapathi, et al., "A suffix tree approach to anti-spam email filtering." Machine Learning, 65, 2006, 40 pages.

Salton, et al., "On the use of spreading activation methods in automatic information retrieval." In Proceedings of 11th Annual International Conference on Research and Development in Information Retrieval, ACM, pp. 147-160, 1988.

Salton, et al., "A vector space model for automatic indexing." Communication of ACM, 18(11):613-620, 1975, 8 pages.

Eissen, et al., "The suffix tree document model revisited." In Proceedings of the 5th International Conference on Knowledge Management, pp. 596-603, 2005, 8 pages.

Ukkonen, "On-line construction of suffix trees." Algorithmica, 14(3):249-260, 1995.

* cited by examiner

Table 1: Overview of the Document Sets (Corpus Type: O-OHSUMED, R-RCV1)

| Document Set | DS1 | DS2 | DS3 | DS4 | DS5 | DS6 |
|---|---|---|---|---|---|---|
| Corpus Type | O | O | O | R | R | R |
| #categories | 3 | 5 | 8 | 4 | 6 | 10 |
| #documents | 300 | 500 | 800 | 400 | 600 | 2,000 |
| #nodes | 57,490 | 100,172 | 151,289 | 233,323 | 313,965 | 505,405 |
| #overlap nodes | 5,342 | 8,914 | 13,259 | 29,644 | 37,945 | 57,855 |

Table 2: F-measure Scores of the clustering results for 6 Document Sets

| Document Set | DS1 | DS2 | DS3 | DS4 | DS5 | DS6 | Average |
|---|---|---|---|---|---|---|---|
| STC | 0.70 | 0.72 | 0.67 | 0.73 | 0.68 | 0.56 | 0.68 |
| #clusters | 452 | 473 | 474 | 445 | 451 | 482 | 457 |
| STC-10 | 0.56 | 0.38 | 0.28 | 0.77 | 0.47 | 0.28 | 0.46 |
| TDC | 0.73 | 0.67 | 0.33 | 0.62 | 0.59 | 0.37 | 0.55 |
| NSTC | 0.91 | 0.94 | 0.80 | 0.83 | 0.85 | 0.67 | 0.83 |

FIG. 12

```
+ Category 1. iPOD, file, update, iTunes, fold
|- 2 ipods on one computer
|- Can I hook up my ipod to a friends computer to get his songs
|- Songs on Hard drive vs.songs on source list.
|- help! all existing songs will be replaced if i update?
|- 60GB Photo iPod Replacement - STILL problems
      .
      .
+ Category 2. iPOD, USB, connect, update, device
|- Cant Format Ipod.
|- iPod 60GB won't power off.
|- Computer eror happened during reformatting
|- Screen Frozen w Apple Image
|- Belkin firewire card
```

FIG. 16

SUFFIX TREE SIMILARITY MEASURE FOR DOCUMENT CLUSTERING

CROSS-REFERENCE TO THE RELATED APPLICATIONS

This application is based upon and claims the benefit of priority from the prior U.S. provisional application 61/051,151 the entire contents of which are incorporated herein by reference.

TECHNICAL FIELD

The present innovation relates to the art of data mining and more specifically to the art of clustering documents by suffix tree methods for effective data mining in web based documents.

BACKGROUND OF THE INVENTION

Knowledge collaboration includes contributing to, authoring within, discussing, sharing, exploring, and deploying a collective knowledge base. The World Wide Web (WWW) opens up new possibilities for people to share knowledge, exchange information, and conduct knowledge collaboration. Numerous kinds of knowledge collaborative online communities are now available as a result of knowledge input on the WWW, for example, Weblog and Wiki have become well known sources of collaborative information and are now common words in daily life. Despite the influx of data to these and other collaborative knowledge bases, computers have no understanding of the content and meaning of the submitted information data. Assessing and classifying the information data has mainly relied on the manual work of a few experienced people (e.g., wiki editors, discussion board moderators, . . . ) in these knowledge collaboration systems. With the growth of a community, the workload of the manual sorting can become monumentally complex and difficult to achieve. Generally, the more people that join a discussion or contribute knowledge and information data, the heavier workload placed on experienced information sorters.

Document clustering and classification has long been studied as a post-retrieval document visualization technique. Document clustering algorithms attempt to group documents together based on their similarities such that documents that are relevant to a certain topic will typically be allocated to a single cluster (e.g., topic, idea, concept, response, . . . ) A document clustering algorithm, for example, to categorize WWW documents in an online community can substantially reduce the reliance on human information sorters and can provide efficiency, speed, and accuracy advantages for sorting over the human analog. Automated clustering, for example, can be very helpful in speeding up knowledge collaboration in online communities. For example, experienced members and editors can focus on identifying and assessing high qualify documents more easily and efficiently where automated sorting has automatically provided relevant clusters for additional refinement. Also for example, an efficient online searching service using automated clustering can easily provide a categorical index of a whole forum which can aid users, especially novice users or forum guests, when looking for topics of interest within a plurality of knowledge sources.

Research into document clustering can generally be classified into the two divergent areas of graphical and vector document modeling for clustering. Vector data models generally strip words from documents into vectors of words that can then be compared for similarity. Graphical data modeling generally includes graphical tree data modeling techniques. These tree techniques can include suffix tree modeling wherein phrases can be placed into a representative tree structure to generate a compact model of phrases in a document allowing similarity calculations by traversing branches of the tree.

Text document clustering has been traditionally investigated as a means of improving the performance of search engines by pre-clustering an entire corpus of documents. The methods used for document clustering covers several research areas, such as database, information retrieval, and artificial intelligent including machine learning and natural language processing. The Agglomerative Hierarchical Clustering (AHC) algorithm is generally considered to be the most commonly used algorithm among the numerous document clustering algorithms. There are several variants from this algorithm, e.g., single-link, group-average and complete-link. In practice, the AHC algorithm can often generate a high quality clustering result with the tradeoff of a higher computing complexity.

In traditional vector document models, words or characters are considered to be atomic elements in statistical feature analysis and extraction. Clustering methods mostly make use of single word/term analysis of a document data set. In order to achieve more accurate document clustering, development of more informative features (e.g., bigrams, trigrams and much longer n-grams) needs to receive considerable attention in future information retrieval research. Vector document model clustering suffers from a failure to account for the importance of the sequence order of words comprising phrases in documents. The sequence of words can convey additional information over the mere presence and frequency of a word, however, this information is typically discarded in vector data model clustering techniques to the detriment of more optimized clustering.

A suffix tree document model was first proposed in 1997 and differed from vector document models, which treat a document as a set of words and ignore the sequence order of the words, by considering a document to be a set of suffix substrings. In the suffix tree document model the common prefixes of the suffix substrings are selected as phrases to label the edges of a suffix tree. Numerous derivative suffix tree document models were developed based on this generic suffix tree model and work well in clustering WWw document snippets returned from several specific search engines. Generally, these derivatives are often essentially only based on fusion heuristics that evaluate the suffix tree document model on graphbased similarity measures for large document collections to compute the document similarities. Little attention is given to effective quality measurements in cluster phrases or the agglomeration of clusters under these cluster phrases to the detriment of more optimal clustering.

SUMMARY

The following presents a simplified summary of the subject innovation in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Clustering techniques generally reply on four concepts: a data representation model, a similarity measure, a clustering model and a clustering algorithm that generates the clusters using the data model and the similarity measure. One popular data representation model is the Vector Space Document (VSD) model. VSD is a very widely used data representation model for document classification and clustering and can be applied to online documents. The common framework of the VSD data model is a representation of any document as a feature vector of the words that appear in the data set (e.g., the document). Commonly, each feature (e.g., word) in the feature vector is given a weighting (typically a word-frequency). For effective use of the VSD model, word order is typically not maintained so that the feature vector can be sorted (e.g., alphabetically) to effect fast comparison algorithms during similarity calculations. A similarity between two documents can then be approximated by computing the similarity between two or more feature vectors with one of several similarity measures (e.g., cosine measure, Jaccard measure, Euclidean distance measure . . . ). The statistical features of all words are taken into account when determining word term weights and similarity measures in VSD without regard to word order or sequence in a phrase or document.

Another common data representation model is the suffix tree document model. The suffix tree document model, unlike the VSD model, can maintain the word order of suffixes (e.g., phrases). A phrase is an ordered sequence of one or more words. This order is generally maintained by the hierarchical tree structure, such that as nodes are linearly interconnected (e.g., from root to leaf node) the ordered phrase can be extracted. One particular embodiment of the suffix tree document model for clustering is the model produced by the Suffix Tree Clustering (STC) algorithm as proposed by Zamir and Etzioni and used in their meta-search engine. STC is a linear time clustering algorithm (linear in the size of the document set), which is based on identifying phrases that are common to groups of documents. STC can generate a suffix tree which can then be analyzed to form clusters, for example, by most traversed phrase nodes. Implementing the STC algorithm, according to the description given by Zamir's papers, can generate good results in clustering standard documents as well as document snippets. However, the STC algorithm can also generates massive clusters with poor quality and thus can yield less relevant and useful clustering results. Where the distinct possibility of poor clustering exists, confidence in the results can be diminished. This problem with the STC algorithm lowers the overall effectiveness of implementing the STC algorithm as a reliable automated sorting and clustering technique.

Analyzing the original design of STC algorithm, the reason for large clusters in the STC algorithm is primarily that there is no effective quality measure to evaluate the generated clusters in STC. This lack of quality measurement typically applies to both the base clusters (e.g., those clusters designated by the overlap of nodes (e.g., phrases) in a suffix tree) and the resulting clusters generated by cluster merging (e.g., merging smaller "similar" clusters). Furthermore, STC weighting of overlap phrases is individually calculated from the length of the phrase (e.g., the number of words in it) and document frequency (df) (e.g., the number of documents containing the phrase). Therefore, the STC algorithm generally lacks an efficient similarity measure to assess the importance of each phrase in a global view of entire document set.

Research in document clustering has not previously incorporated an efficient similarity measure into a suffix tree model for document clustering. Interestingly, research into clustering has generally bifurcated into two dominant but isolated research camps, those focusing on VSD style techniques and those focusing on STC style techniques. In contrast to the heretofore isolated research in either STC or VSD, the presently disclosed subject matter can incorporate the general advantages of both efficient quality measurement and retention of word sequence for similarity measurements in document clustering.

Mapping each node of a suffix tree (excluding the root node) into a unique dimension of a M-dimensional space generates a feature vector representing each document in M nodes (e.g., where M is the total number of nodes in the suffix tree except the root node). The feature vector can then be weighted by rationally applying term weighting schemes to the nodes in the feature vector of the suffix tree document model. Consequently the weight (e.g., based on term frequency (tf) and/or document frequency (df)) of each node is recorded in building the feature vector of a suffix tree from a document. A similarity calculation can then be conducted (e.g., a cosine similarity measure) on a plurality of suffix tree feature vectors to compute the pairwise similarity of the plurality of documents. Combining the sequence order of the words in a document in a suffix tree model and the term weighting scheme for effective quality measurement, the new suffix tree similarity measure (NSTM) can generate excellent results in clustering algorithms, such as the Group-average Agglomerative Hierarchical Clustering (GAHC) algorithm. As an example, the resulting new suffix tree document clustering (NSTC) algorithm (e.g., NSTM employed in the GAHC algorithm (or other clustering algorithms)) is very effective in clustering standard documents of the data sets generated from OHSUMED and RCV1 corpuses.

To the accomplishment of the foregoing and related ends, the innovation, then, comprises the features hereinafter fully described. The following description and the annexed drawings set forth in detail certain illustrative aspects of the innovation. However, these aspects are indicative of but a few of the various ways in which the principles of the innovation may be employed. Other aspects, advantages and novel features of the innovation will become apparent from the following detailed description of the innovation when considered in conjunction with the drawings.

BRIEF DESCRIPTION OF THE DRAWINGS

FIG. 12 illustrates two tables comparing exemplary data, the first table containing exemplary corpus data and the second table containing corresponding exemplary data for F-measure scores for the clustering of 6 document sets.

FIG. 16 illustrates an exemplary topic summary result from two categories of a WWW document clustering process.

DETAILED DESCRIPTION

Figure 1:
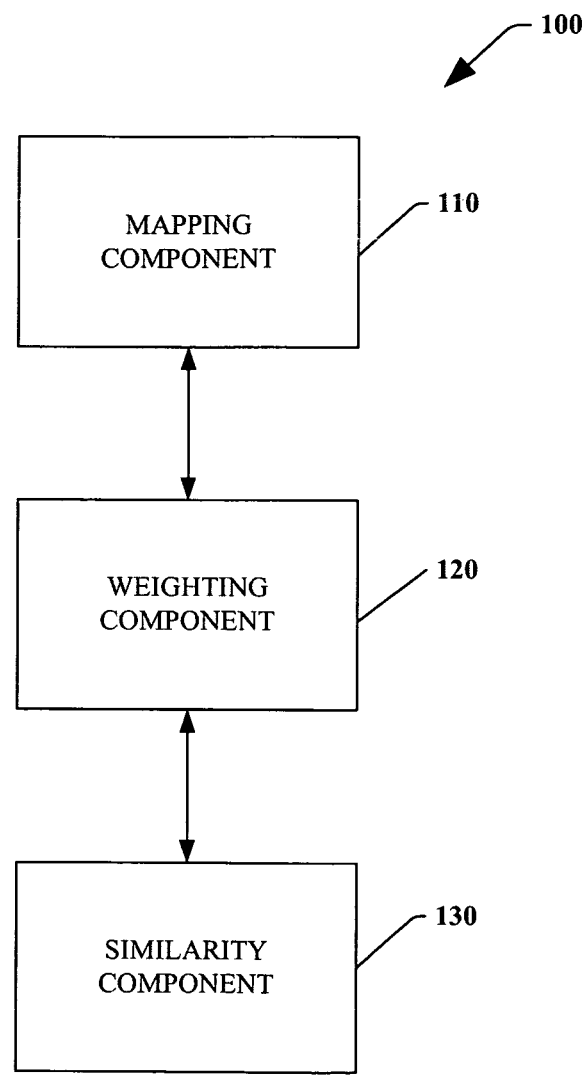
FIG. 1 illustrates a system to facilitate document similarity measure.

The subject innovation is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the innovation.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The disclosed subject matter provides for system(s) and method(s) relating to clustering documents employing an effective quality measurement with a suffix tree document model. As previously stated the original design of a typical suffix tree document model clustering algorithm can be prone to unwieldy and inaccurate large clusters due a lack of an effective quality measure to evaluate the clusters being generated. The lack of an effective quality measurement for both base clusters (e.g., those clusters designated by the overlap of nodes (e.g., phrases) in a suffix tree) and merged clusters can reduce the efficacy of suffix tree document model clustering. The simplistic weighting of overlap phrases by individually calculating the length of the phrase (e.g., the number of words in it) and document frequency (df) (e.g., the number of documents containing the phrase), both from counts maintained at nodes, provides only a cursory score for sorting both in base clusters and in cluster merging. In contrast to typical suffix tree document model clustering algorithms that lack efficient similarity measures to assess the importance of each phrase in a global view of entire document set, the disclosed subject matter applies improved quality measures to facilitate more accurate clustering results.

Research in document clustering has not previously incorporated an efficient similarity measure into a suffix tree document model for document clustering. Interestingly, research into clustering has generally bifurcated into two dominant but isolated areas of focus, vector style suffix tree style document modeling techniques. In contrast to either the vector or suffix tree style document models, the presently disclosed subject matter provides both efficient quality measurement and retention of word sequence for similarity measurements in document clustering. By mapping each node of a suffix tree (excluding the root node) into a unique dimension of a M-dimensional space generates a feature vector representing each document in M nodes is generated (e.g., where M is the total number of nodes in the suffix tree except the root node). The feature vector can then be weighted by rationally applying term weighting schemes to the nodes in the feature vector mapped from the suffix tree document model. Consequently the weight (e.g., based on term frequency (tf) and/or document frequency (df)) of each node is recorded in building the feature vector of a suffix tree from a document. A similarity calculation can then be conducted (e.g., a cosine similarity measure) on a plurality of suffix tree feature vectors to compute the pairwise similarity of the plurality of documents. Combining the sequence order of the words in a document in a suffix tree model and the term weighting scheme for effective quality measurement, the new suffix tree similarity measure (NSTM) can generate excellent results in clustering algorithms, such as the Group-average Agglomerative Hierarchical Clustering (GAHC) algorithm.

Generally, a suffix tree is a data structure that allows efficient string matching and querying. Suffix trees have been studied and used extensively in fundamental string problems, for example, large volumes of biological sequence data searching, approximate string matches, and text features extraction in spam email classification, among others. In a suffix tree document model, a document is regarded as a string consisting of discrete words rather than single characters. During population of a suffix tree document model, each suffix of a document is compared to all suffixes which exist in the suffix tree document model already to find a position for inserting the instant suffix.

The earliest methods to build a suffix tree for a document of m words took $O(m_2)$ time. Later methods of building suffix trees relied on the research of Ukkonen, who provided an algorithm to build a suffix tree that was time linear to the size of the document. Under Ukkonen, the time complexity of building a suffix tree is $O(m)$. A drawback to Ukkonen's algorithm is the poor memory space efficiency of the resulting suffix tree. Still, where the memory cost is acceptable, Ukkonen's algorithm makes it possible to build a large incremental suffix tree accommodating the dynamic insertion and removal of a document into the suffix tree (e.g., documents can be inserted into or removed from a suffix tree without rebuilding the entire suffix tree). This suffix link data structure allows the searching algorithms to move quickly from one part of the tree to a distant part of the tree in a large suffix tree. Additionally, the use of a doubly-linked list data structure also enables numerous additional search strategies for clustering algorithms in alternative embodiments of the disclosed subject matter (e.g., node⇆edge⇆suffix_node). For simplicity and clarity of disclosure, only the bottom-up search to extract all internal nodes that traversed by a document will be discussed in any length, though one of skill in the art will appreciate that all of the additional search strategies should be considered within the scope of this disclosure.

Assuming that there are N distinct documents in a data set D, and the average length of the documents is m (by words), then there are a total of (N·m) leaf nodes in the suffix tree generated from the N documents and each leaf node represents a suffix of a document from D. The average time cost for finding m leaf nodes representing all suffixes of a document would be (N·m) because a full traverse of (N·m) leaf nodes occurs (e.g., the tree data structure directly maintains a list of all leaf nodes). Where each node in a suffix tree has only one uplink node, the cost for calling back all parent internal nodes of a leave node is trivial in the bottom-up search. Consequently the time cost of extracting the all internal nodes traversed by two documents and computing the similarity (e.g., cosine similarity) is time linear to the size of document set (2·m·M), regardless of the total number of nodes, M, in the suffix tree. Therefore, the total time cost for computing all pairwise similarities for all documents in D is [N·(N−1)·m·N]=m·N³. In practice, the time cost of manipulating the suffix tree to compute the document similarities is very close to the cost of the same operation on an inverted index.

In text-based information retrieval, a document model is a concept that describes how a set of meaningful features is extracted from a document. Generally, a suffix tree document model considers a document as a string consisting of words rather than characters, as can be represented by $d=w_1 w_2 \ldots w_m$, where d is a document and $w_i$ is the $i^{th}$ word where $i=1, 2, \ldots m$. A suffix tree of document d is a compact tree containing all suffixes of document d. The nodes of a suffix tree are typically drawn in circles and each internal node can have at least two child nodes. Suffix tree edges and their suffix nodes are labeled with non-empty substrings of a document (e.g., a phrase). Thus, each leaf node in the suffix tree designates a suffix of a document; each internal node represents an overlap phrase shared by at least two suffixes, and the more internal nodes shared by two documents, the more similar the two documents are likely to be.

By mapping all nodes n of the common suffix document tree to a M-dimensional space (e.g., similar to a vector document model) where (n=1, 2, ..., M), each document d can be represented as a feature vector of the weights of M nodes such that, d={w(1, d), w(2, d), . . . , w(M, d)}. The individual weights, w, can be calculated to provide more effective weighting than is traditionally employed in a suffix tree document model clustering algorithm. As previously stated, conventional suffix tree document model clustering algorithms generally score clusters based on the word string length and number of documents in a base cluster and do not provide an adequate quality measurement.

In contrast, the herein disclosed subject matter contemplates weighting the M nodes in d by the term frequency-inverse document frequency measure (tf-idj). Thus, tf-idf can be used to assign weights to each of the individual word terms appearing in all documents comprising the document set. Where each document is represented as a feature vector in the M-dimensional space, the document frequency of each node (df(n)) is the number of different documents that traverse the node n and the term frequency (tf(n,d)) of a node n with respect to a document d is the total number of times a document d traverses the node n.

Determining the weight w(n,d) of the nodes n in document d by tf-idf can be calculated by the formula:

$$tf\text{-}idf(n, d) = (1 + \log(tf(n, d))) \cdot \log\left(1 + \frac{N}{df(n)}\right)$$

where N is the number of distinct documents d comprising a document set D such that $d=\{d_1, d_2, \ldots d_N\}$. Thus it is clear that the tf-idf weighting incorporates a global quality factor not present in conventional suffix tree algorithms, in that tf-idf weighting used in conjunction with the suffix tree mapped to a vector incorporates the total number of documents from the entire document set D in determining the weighting factor of individual nodes n within each individual vector representation of documents d comprising the entire document set D.

After calculating the term weights for all nodes, a similarity measure can be used to compute the similarity of two documents. One of skill in the art will appreciate that nearly any similarity measure can be employed after mapping and weighting to determine the similarity between two documents. For simplicity and clarity, cosine similarity will be used as a representative similarity measure with regard to the disclosed subject matter, though one of skill in the art will appreciate that other similarity measures can be employed and any and all of these should be considered within the scope of the disclosed subject matter. The cosine similarity measure, $$sim_{cos}(\vec{d_i}, \vec{d_j}) = \frac{\vec{d_i} \cdot \vec{d_j}}{|\vec{d_i}| \times |\vec{d_j}|}$$

can be used to calculate the pairwise similarities between all documents in D.

FIG. 1 illustrates a system 100 for performing document similarity measure. In contrast to conventional suffix tree document model algorithms for document clustering that simply employ phrase length determinations (number of words in a phrase) and word frequencies in documents, the disclosed subject matter incorporates improved weighting techniques by first mapping the nodes of a suffix tree document model to a vector and then applying an improved weighting factor that contemplates the term frequency in relation to the document frequency before determining the similarity between documents in a document set. Mapping component 110 in system 100 facilitates mapping a populated suffix tree document model into a vector representation in anticipation of weighting. A suffix tree document model can be mapped from the graphical representation (e.g., from the data structure(s) of the suffix tree document model) of the phrase nodes in a document that is an element of a document set D to a vector document model representation. The vector document model representation can be d={w(1, d), w(2, d), . . . , w(M, d)}, where d is an individual document, w is a weighting factor, and M is the total number of nodes in the vector such that there are nodes (n=1, 2, . . . , M). Thus a mapping of N documents d in a document set D can appear, for example, as D={w(1,1), w(2,1), . . . , w(M, 1), w(1,2), w(2,2), . . . , w(M, 2) . . . w(M, N)} for M nodes and N documents in the document data set D.

Further, mapping can comprise "cleaning" the text. Stopwords are frequently occurring, insignificant words that appear in documents. They are typically of little or no to indexing or use in search engines or other search indexes. Stopwords Lists and stemming algorithms are two information retrieval techniques for preparing text document for clustering or other textual analysis or manipulation. Standard Stopwords Lists and the Porter stemming algorithm can be used to preprocess documents to get "clean" documents for suffix tree document models and/or for mapping suffix tree document models to a vector document model. However, standard Stopwords Lists typically miss some commonly occurring words that slightly affect the precision of suffix tree similarity measures.

Although the tf-idf weighting scheme has provided a solution to reduce the negative effect of words on standard Stopwords Lists, almost all popular document clustering algorithms still prefer to consider these words and ignore them in subsequent document similarity measurement. For example, some suffix tree document clustering algorithms maintain a stoplist that is supplemented with Internet specific words in computing the score of each base cluster (e.g., "previous", "java", "frames", "mail", . . . ). Words appearing in the stoplist, or that appear in too few or too many documents can receive a score of zero in computing the score s(B) of a base cluster where s(B)=|B|·f(|P|), where |B| is the number of documents in base cluster B, and |P| is the number of words in phrase P. Base clusters can then be sorted by the score s(B), and the top k base clusters can be selected for cluster merging in subsequent manipulations (however, as discussed herein, this "weighting" is of limited efficacy as it fails to fully consider the used of words across the entire set of documents as is achieved in accordance with the disclosed subject matter).

Further, conventional vector document models ignore the occurring position of words (e.g., word sequence) and thus, for conventional vector document models (e.g., those not mapped from a suffix tree document model) simply ignoring these stoplist words in the similarity measure can be reasonable. In contrast, a suffix tree document model generally is trying to keep the sequential order of each word in a document, the same phrase or word might occur in different nodes of the suffix tree and thus simply ignoring the words (or phrases) becomes impractical in that valuable information is lost.

Therefore, in accordance with the disclosed subject matter where a suffix tree model is mapped to a vector, the term of a word is replaced by the term of a node in the suffix tree document representation to facilitate mapping to a vector. A new "stopnode" (e.g., different from but analogous to the stoplist), can apply the same idea of stopwords used in the suffix tree similarity measure computation. A node with a high document frequency (df) can be ignored in the similarity measure, but the corresponding phrase and its words can be kept by other nodes in the suffix tree for use in mapping to a vector. In the document clustering algorithm, a threshold ($idf_{thd}$) of inverse document frequency (idf) can be given to identify whether a node is a stopnode so s to facilitate the limited exclusion of words/nodes that carry little information alone and yet can be of importance in phrases and thus improve clustering when kept through the mapping process.

Weighting component 120 can be communicatively coupled to mapping component 110. Weighting component 120 can determine weighting factors according to a weighting algorithm for each node in a feature vector of document d that is part of a document set D. One of skill in the art will appreciate that numerous weighting algorithms can be employed in determining the weighting factors of the mapped vector representation and that all of these algorithms are within the scope of the herein disclosed subject matter where they include information about the terms/phrases across multiple documents d in the document set D. For simplicity and clarity, an exemplary weighting algorithm can be the tf-idf formula $$tf\text{-}idf(n, d) = (1 + \log(tf(n, d))) \cdot \log\left(1 + \frac{N}{df(n)}\right),$$

where N is the number of distinct documents d comprising a document set D such that d={$d_1, d_2, \ldots d_N$}. As stated herein, the tf-idf weighting incorporates a global quality factor not present in conventional suffix tree algorithms because tf-idf weighting used in conjunction with the suffix tree mapped to a vector incorporates the total number of documents from the entire document set D in determining the weighting factor of individual nodes n within each individual vector representation of documents d comprising the entire document set D.

Similarity component 130 can be communicatively coupled to the weighting component 130. Similarity component 130 can determine the similarity between different documents d in document set D to facilitate effective clustering. As stated herein, the similarity algorithm can be any of a nearly limitless number of algorithms that allow a determination of similarity between the mapped vector representations of documents d to be compared from the document set D. Also as stated herein, for simplicity and clarity, the cosine similarity algorithm, $$sim_{cos}(\vec{d_i}, \vec{d_j}) = \frac{\vec{d_i} \cdot \vec{d_j}}{|\vec{d_i}| \times |\vec{d_j}|},$$

can be a representative example of an effective similarity algorithm. Generally, as the value of $sim_{cos}(\vec{d_i}, \vec{d_j})$ decreases, documents are more similar and as the value of $sim_{cos}(\vec{d_i}, \vec{d_j})$ increases towards 1, documents are less similar.

In an embodiment of the disclosed subject matter, additional information gleaned during population of the suffix tree document model or mapping of the document into the vector representation can be employed to facilitate generation of cluster topics. A quality score can be determined based on this additional information, for example, where the document results from a series of posts in an online forum, the additional information can include subject title, submitted time, author, view clicks, recommend clicks, . . . . This additional information can be stored for use in determining a quality score.

In one embodiment of the innovation, the document similarity measure can be used to Web document clustering in online forum communities. For example, given an online forum, each post of the online forum can be analyzed. Posts with same thread can be combined into a single document. The documents are mapped into suffix tree and their pairwise similarities can be calculated by system 100. Clustering results can be built by utilizing GAHC algorithm. Topic summaries thus can be generated to label the clusters.

Figure 2:
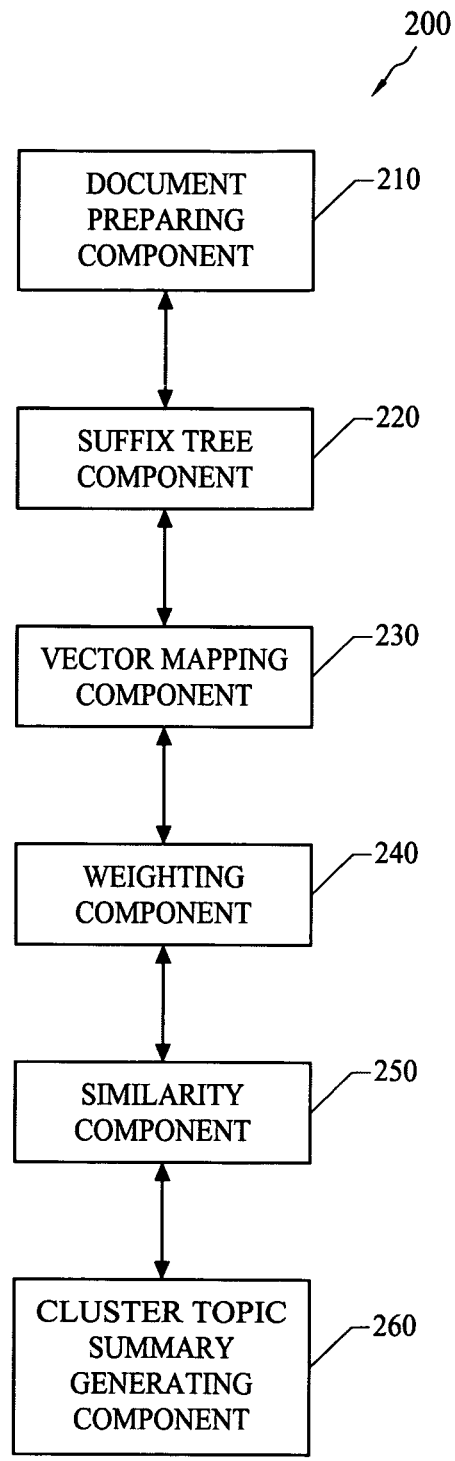
FIG. 2 illustrates a system to facilitate online forum document clustering.

FIG. 2 illustrates a system 200 to facilitate online forum document clustering. System 200 can include a document preparing component 210 that can acquire and analyze all posts of an online forum. An initialization component can be coupled to the document preparing component 210. The initialization component executes a initialization procedure, which may comprises the following functions: stripping off all non-word tokens, prasing the text of a post into words, identifying and removing stopwords, applying Porter stemming algorithm to all words, incorporating all stemmed words to form a new plain text post. Specifically, stopwords are frequently occurring, insignificant words that appear in documents. They are typically of little or no to indexing or use in search engines or other search indexes. Stopwords Lists and stemming algorithms are two information retrieval techniques for preparing text document for clustering or other textual analysis or manipulation. Standard Stopwords Lists and the Porter stemming algorithm can be used to preprocess documents to get "clean" documents for suffix tree document models and/or for mapping suffix tree document models to a vector document model. However, standard Stopwords Lists typically miss some commonly occurring words that slightly affect the precision of suffix tree similarity measures.

A suffix tree component 220 that can form a suffix tree document model from available documents. A weighting component 240 can be communicatively coupled to the vector mapping component 230. The weighting component 240 can weight the factors/terms of the vector document model representation as herein disclosed. A particular embodiment of the disclosed subject matter can employ a weighting algorithm that can be the tf-idf formula given herein. The weighting component 240 can be communicatively coupled to a similarity component 250 that can facilitate determining the similarity between documents d comprising a document set D mapped into the vector document model representation from the suffix tree document model representation by vector mapping component 230.

A cluster topic summary generating component 260 is coupled to the similarity component 250. Cluster topic summary generating component 260 may perform the following functions: ranking the documents in a cluster by a quality score, extracting common phrases as the topic summary of the corresponding cluster. In one embodiment of the invention, cluster topic summary generating component 260 utilizes some human assessments for facilitating the topic summary generating. For instance, suppose there are three statistical scores provided in a given forum system, view clicks, reply posts and recommend clicks. The quality score of a document d can be calculated by $q(d)=|d| \cdot v \cdot r \cdot c$, where $|d|$ is the number of words in the document, v is view clicks, r is reply posts, and c is recommend clicks of the document respectively. The documents in the same cluster can then be sorted by their quality scores. For example, the top 10% of documents can be selected as the representatives of the cluster (assuming that there is a predetermined minimum number of documents in the cluster). The nodes traversed by the representative documents can then be selected and sorted by their idf in ascending order. Then the top 5 nodes, for example, can be selected (generally excluding stopnodes). These selected nodes can be traversed such that the original words in their phrases (without stemming) form a topic summary to label the cluster. This labeling is therefore based on a quality measure related to the additional information associated with the content of the document.

Figure 3:
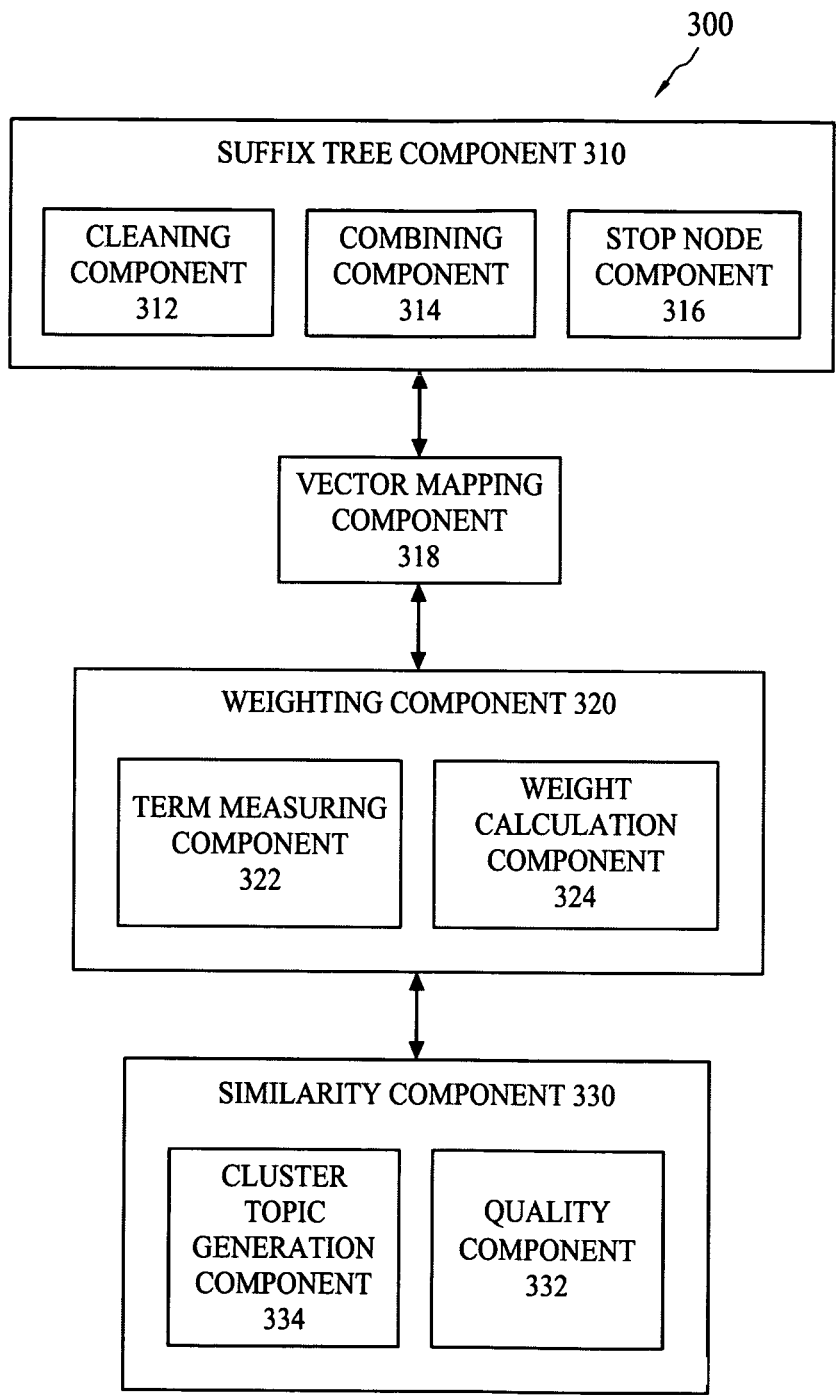
FIG. 3 illustrates a system to facilitate online forum document clustering.

FIG. 3 illustrates a system 300 to facilitate online forum document clustering. System 300 can be the same as or similar to system 200 and/or system 100. System 310 can include suffix tree component 310 that can be the same as or similar to suffix tree component 220. Suffix tree component 310 can include a cleaning component 312 that can clean data for populating a suffix tree document model as herein disclosed. Suffix tree component 310 can include a combining component 314 that can combine overlapping nodes in the suffix tree document model. Combining overlapping nodes in the suffix tree document model can reduce the complexity and size of the suffix tree model. Suffix tree component 310 can include a stopnode component 316 that can facilitate employing stopnodes as herein described into the suffix tree document model. Employing stopnodes can facilitate retaining term information in a subset of the branches of a suffix tree document model where some terms are of little or no value in some branches but have sufficient value in other branches.

System 300 can further include a vector mapping component 318 that can be communicatively coupled to the suffix tree component 310. The vector mapping component 318 can be the same as or similar to vector mapping component 230 and/or mapping component 110. Vector mapping component 318 can be communicatively coupled to a weighting component 320.

Weighting component 320 can be the same as or similar to weighting component 240 and/or 120. Weighting component 320 can include a term measuring component 322 to facilitate determining a longest common prefix (LCP) in the suffix tree. The LCP can facilitate effective sub-string comparisons between vector terms and can facilitate reducing computation costs for calling back parent node traverses when mapping to a vector representation from a suffix tree representation. The LCP can thus be incorporated in determinations of vector factor weights. Weighting component 320 can include a weight calculation component 324 that can determine weight factors for vector terms. A particular embodiment of the weight calculation component 324 in accordance with the disclosed subject matter can employ a weighting algorithm that can be the tf-idf formula given herein.

Similarity component 350 can be the same as or similar to similarity component 250 and/or 130 that can facilitate determining the similarity between documents d comprising a document set D mapped into the vector document model. Similarity component may also include a quality component 332 and a cluster topic generation component 334. The quality component 332 can calculate the quality score of a document d by applying $q(d)=|d| \cdot v \cdot r \cdot c$, where $|d|$ is the number of words in the document, v is view clicks, r is reply posts, and c is recommend clicks of the document respectively. The documents in the same cluster can then be sorted by their quality scores. For example, the top 10% of documents can be selected as the representatives of the cluster (assuming that there is a predetermined minimum number of documents in the cluster). The nodes traversed by the representative documents can then be selected and sorted by their idf in ascending order. Then the top 5 nodes, for example, can be selected (generally excluding stopnodes). Cluster topic generation component 334 can traverse these selected nodes so that the original words in their phrases (without stemming) form a topic summary for labeling the cluster.

The aforementioned systems have been described with respect to interaction between several components. It should be appreciated that such systems and components can include those components or sub-components specified therein, only some of the specified components or sub-components, and/or additional components. Sub-components can also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

FIGS. 4-7 illustrate methodologies, flow diagrams, and/or timing diagrams in accordance with the disclosed subject matter. It is to be appreciated that the methodologies presented herein can incorporate actions pertaining to a neural network, an expert system, a fuzzy logic system, and/or a data fusion component, or a combination of these, which can generate diagnostics indicative of the optimization of clustering operations germane to the disclosed methodologies.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
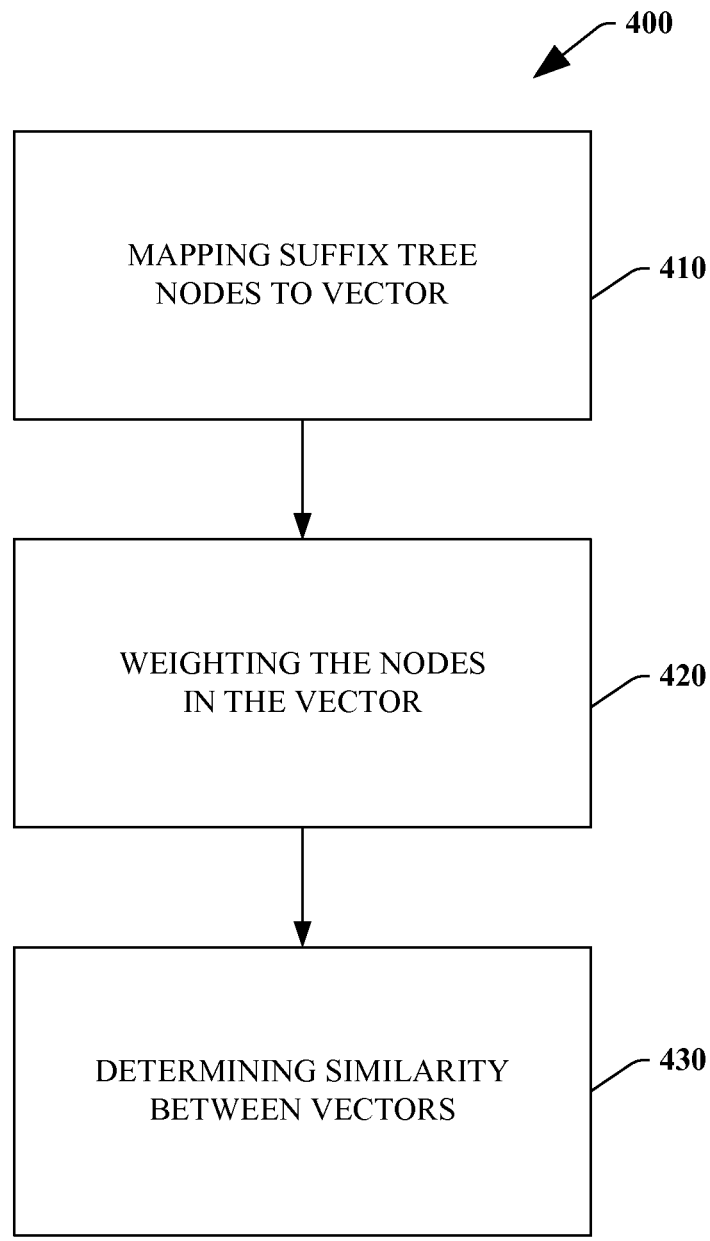
FIG. 4 illustrates a method facilitating weighted suffix tree document clustering.

FIG. 4 illustrates a methodology 400 facilitating weighted suffix tree document clustering. At 410, methodology 400 can include mapping a suffix tree document model representation to a vector document model representation. This mapping can include first forming a suffix tree document model representation, mapping from an existing suffix tree document model representation, first modifying an existing suffix tree document model representation, or some combination thereof. At 420, methodology 400 can include weighting the vector elements mapped from a suffix tree document model representation. As herein disclosed, this weighting can be by numerous weighting algorithms. In one particular embodiment, the weighting algorithm can be by the tf-idf formula given herein. One of skill in the art will appreciate that alternative weighting algorithms not included herein for clarity and brevity are within the scope of the disclosed subject matter.

At 430, the similarity between vector document model representations of documents d comprising a document set D, can be determined. As disclosed herein, numerous similarity measures can be employed in determining the similarity between two documents (e.g., based on the vector representations of those documents). In one particular embodiment in accordance with the disclosed subject matter, the similarity measurement can be by the cosine similarity algorithm, $$sim_{cos}(\vec{d_i}, \vec{d_j}) = \frac{\vec{d_i} \cdot \vec{d_j}}{|\vec{d_i}| \times |\vec{d_j}|}.$$

One of skill in the art will appreciate that alternative similarity algorithms not included herein for clarity and brevity are within the scope of the disclosed subject matter. At this point methodology 400 can end.

Figure 5A:
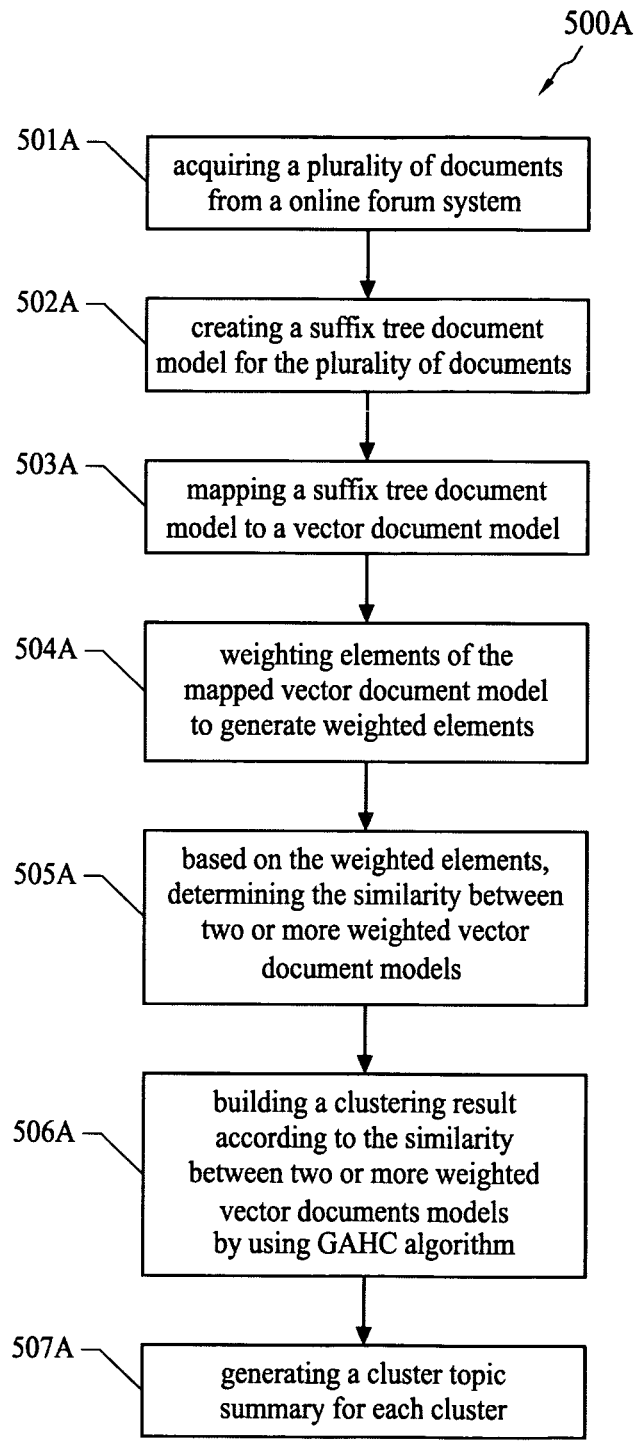
FIG. 5A illustrates a method facilitating facilitate online forum document clustering.

FIG. 5A illustrates a methodology 500A facilitating Web document clustering in online forum communities by applying document similarity measure. For example, given an online forum system, each post of the online forum can be analyzed and posts with same subject title can be combined to documents for facilitating suffix tree clustering, as shown in step 501A. The similarities of two or more documents can be employed to build a clustering result, as shown step 502A-506A. Step 507A shows that topic summaries thus can be generated to label the clusters.

More specifically, analyzing and combining posts can be implemented by at least of the following steps: collecting a topic thread in a online forum, wherein the topic thread comprises a topic post and a plurality of reply posts, stripping non-word tokens from the topic post and the plurality of reply posts, parsing the remaining texts of the topic post and the reply posts into words, identifying and removing stopwords in the parsed posts, applying Porter stemming algorithm to the posts, wherein each stemmed posts have at least three distinct words, combining the stemmed posts into a document, wherein the subject title is selected as the title of the documents, and the text of all selected posts are combined into the document in the order of their submitted time.

Figure 5B:
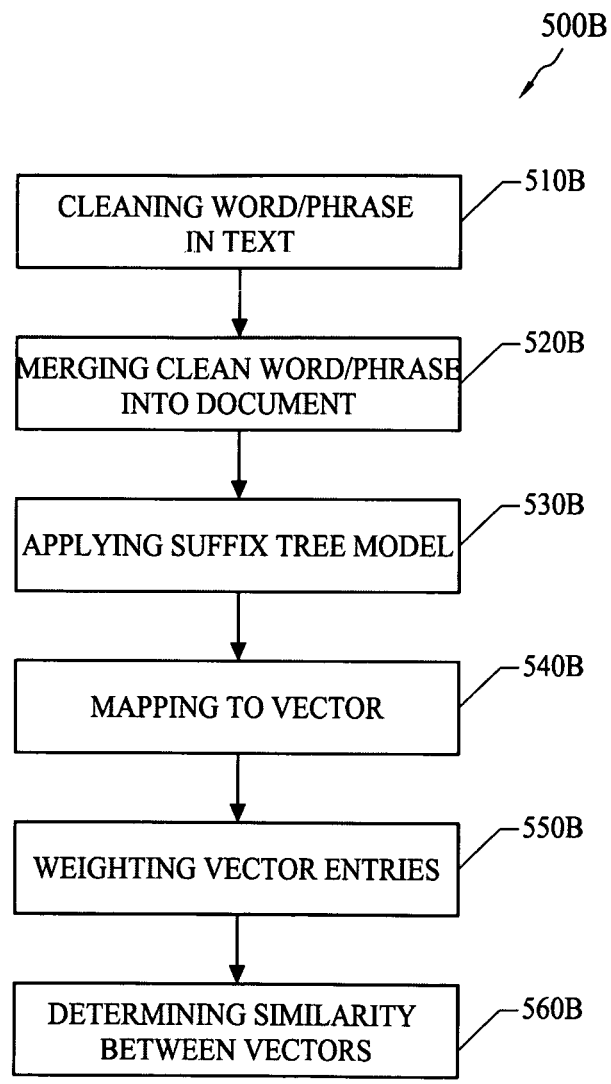
FIG. 5B illustrates a method facilitating weighted suffix tree document clustering.

FIG. 5B illustrates a methodology 500B facilitating weighted suffix tree document clustering. Methodology 500B can be the same as or similar to methodologies 400 and 500A. At 510B, methodology 500B can include cleaning word(s) and phrase(s) to be used in populating a suffix tree document model and/or mapped vector document model as herein disclosed. At 520B, the cleaned words and phrases can be merged into a document. At 530B, the document formed at 520B can populate a suffix tree model (e.g., the suffix tree document model can be applied to the clean document).

At 540B, the suffix tree document model from 530B can be mapped into a vector document model representation. At 550B, the elements of the vector document model representation can be weighted as herein disclosed. This weighting can be by numerous weighting algorithms. In one particular embodiment, the weighting algorithm can be the tf-idf formula given herein. One of skill in the art will appreciate that alternative weighting algorithms not included herein for clarity and brevity are within the scope of the disclosed subject matter.

At 550B, the similarity between two or more vector representations can be determined. As disclosed herein, numerous similarity measures can be employed in determining the similarity between two documents (e.g., based on the vector representations of those documents). In one particular embodiment in accordance with the disclosed subject matter, the similarity measurement can be by the cosine similarity algorithm, $$sim_{cos}(\vec{d_i}, \vec{d_j}) = \frac{\vec{d_i} \cdot \vec{d_j}}{|\vec{d_i}| \times |\vec{d_j}|}.$$

One of skill in the art will appreciate that alternative similarity algorithms not included herein for clarity and brevity are within the scope of the disclosed subject matter. At this point methodology 500 can end.

Figure 6:
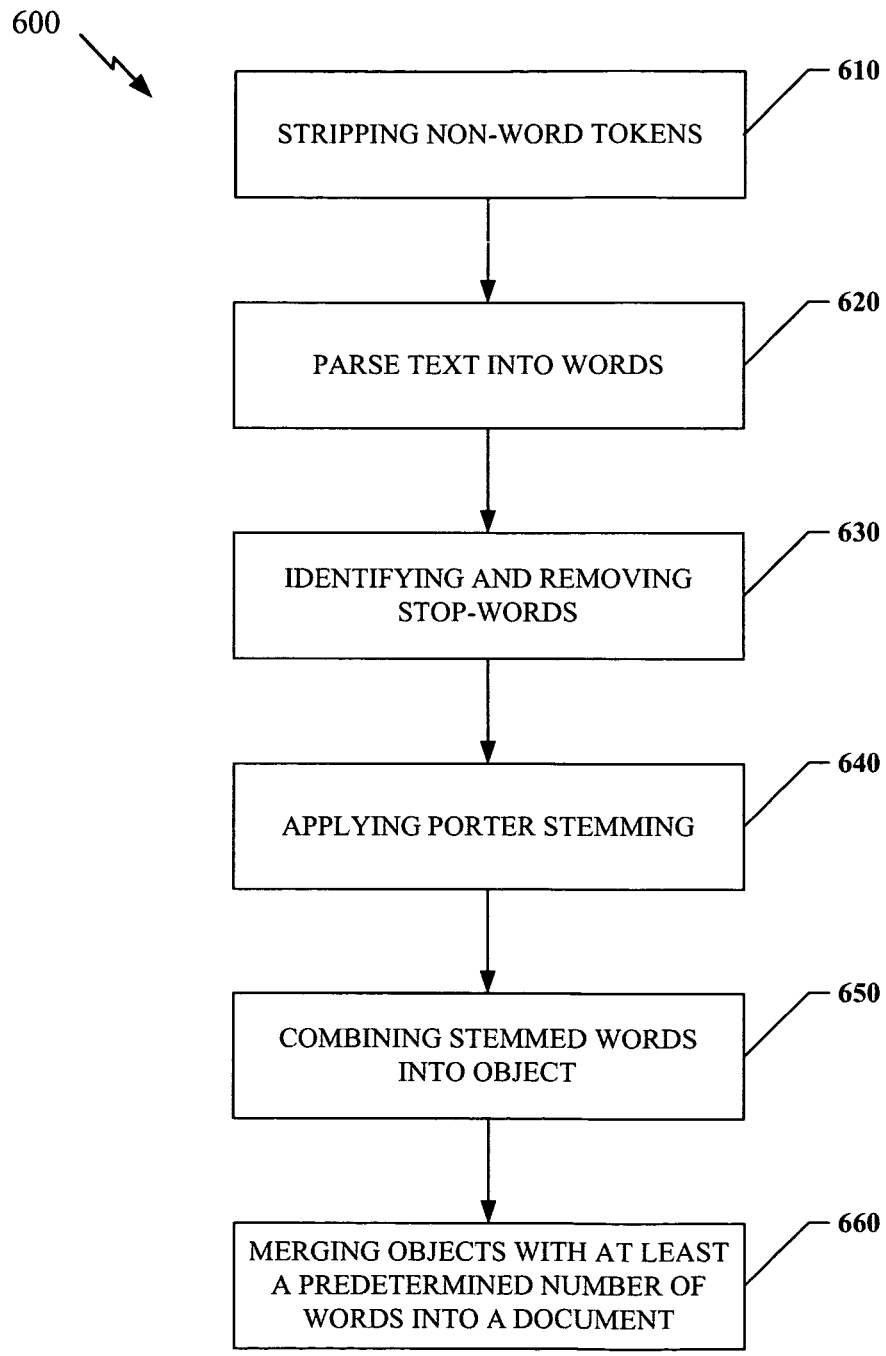
FIG. 6 illustrates a method for cleaning text to facilitate weighted suffix tree document clustering.

FIG. 6 illustrates a methodology 600 for cleaning text to facilitate weighted suffix tree document clustering. Methodology 600 can be the same as or similar to block 510 of methodology 500. At 610, methodology 600 can strip non-word tokens from the text that will be employed to populate a suffix tree document model. At 620, the text can be parsed into individual words. At 630, stopwords can be identified and removed. In conjunction with removing stopwords during cleaning, stopnodes can be identified/created (not depicted in methodology 600) in the corresponding suffix tree document model to facilitate retaining valuable information related to the use of some stopwords in phrases represented by branches of the suffix tree document model as herein disclosed.

At 640, Porter stemming can be applied to the text data. At 650, the text resulting from the Porter stemming at 640 can be combined into objects with text data that can be employed to populate a suffix tree document model representation of the cleaned text. At 660, the text data objects from block 650 not meeting predetermined criteria (e.g., having too few words in them, containing only combinations of stopwords or stopnodes, . . . ) can be merged or eliminated such that the remaining text data objects can be merged into a document (e.g., a larger text data object) that can facilitate populating a suffix tree document model. At this point methodology 600 can end.

Figure 7:
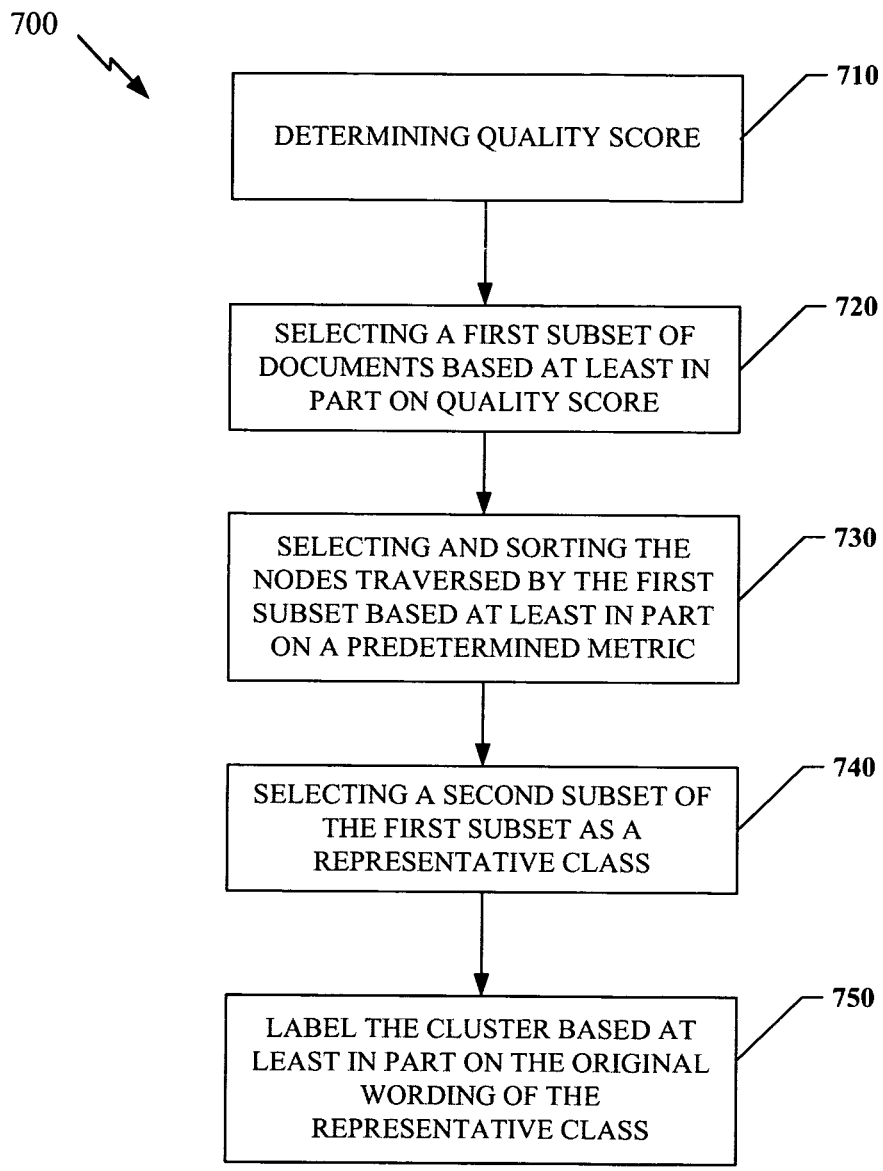
FIG. 7 illustrates a method for determining cluster labels to facilitate weighted suffix tree document clustering.

FIG. 7 illustrates a methodology 700 for determining cluster labels to facilitate weighted suffix tree document clustering. In an embodiment of the disclosed subject matter, additional information gleaned during population of the suffix tree document model or mapping of the document into the vector representation can be employed to facilitate generation of cluster topics. A quality score can be determined based on this additional information, for example, where the document results from a series of posts in an online forum, the additional information can include subject title, submitted time, author, view clicks, recommend clicks, . . . . This, additional information can be stored for use in determining a quality score.

At 710, a quality score can be determined based on additional data available during population of a suffix tree document model. At 720, a first subset of documents can be selected based at least in part on the quality score. At 730, the nodes of the first subset can be traversed to facilitate selecting and sorting based at least in part on a predetermined metric. At 740, a second subset of the first subset can be selected as representative of the class of documents. At 750, a label for the cluster can be determined based at least 1 part on the original wording of the selected representative class from block 740. At this point methodology 700 can end. Returning to a previously disclosed example, WWW documents of a forum system can provide some additional information, including human assessments, for document quality evaluation. For instance, there are three statistical scores provided in our forum system, view clicks, reply posts and recommend clicks. The quality score of a document d can be calculated (block 710) by $q(d)=|d| \cdot v \cdot r \cdot c$, where $|d|$ is the number of words in the document, v is view clicks, r is reply posts, and c is recommend clicks of the document respectively. The documents in the same cluster can then be sorted by their quality scores. For example, the top 10% of documents can be selected (block 720) as the representatives of the cluster (assuming that there is a predetermined minimum number of documents in the cluster). The nodes traversed by the representative documents can then be selected and sorted by their idf in ascending order (block 730). Then the top 5 nodes, for example, can be selected (block 740) (generally excluding stopnodes). These selected nodes can be traversed such that the original words in their phrases (without stemming) form a topic summary to label the cluster (block 750). This labeling is therefore based on a quality measure related to the additional information associated with the content of the document.

Figure 8:
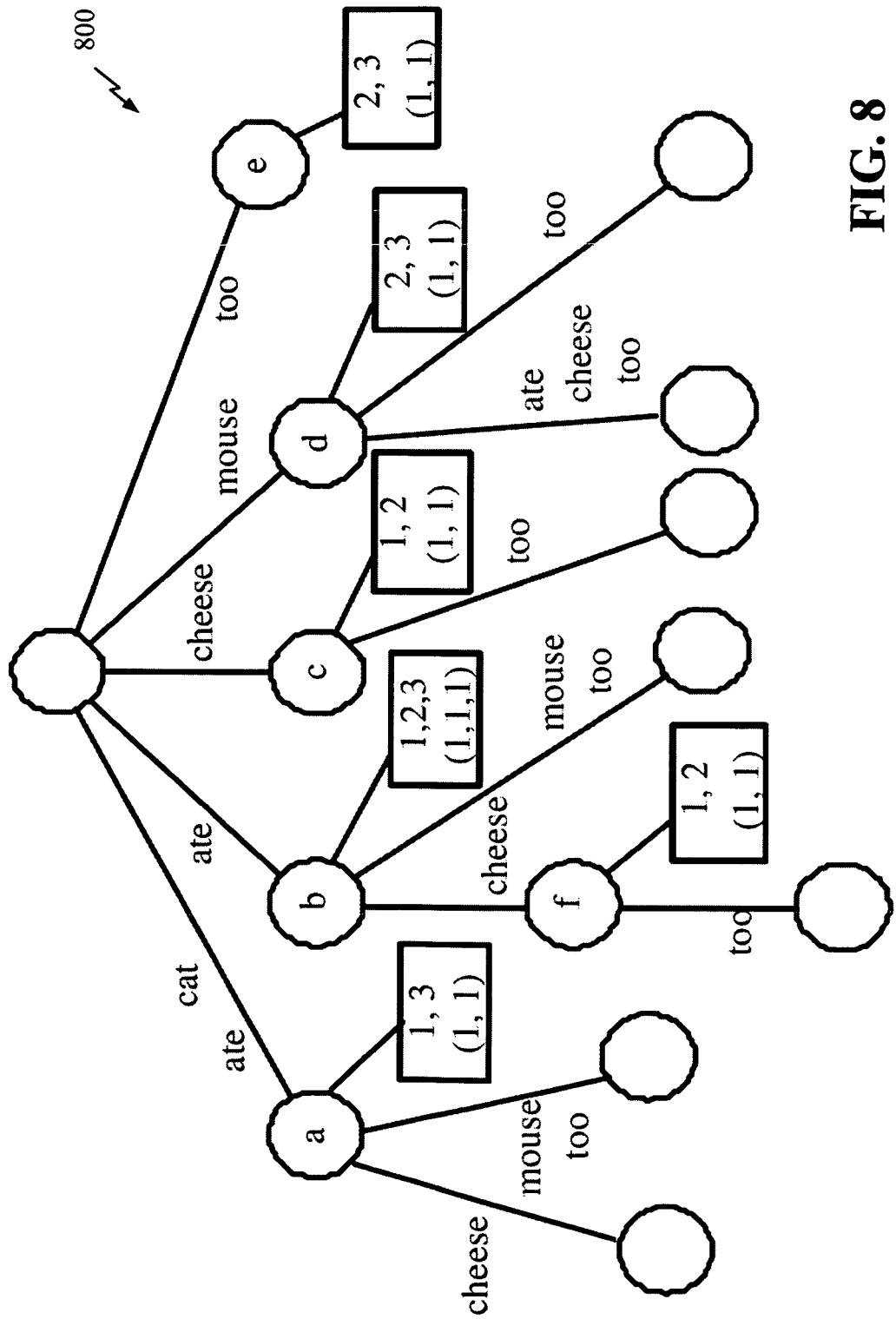
FIG. 8 is a diagram illustrating a graphical representation of the suffix tree document model for the documents, "cat ate cheese", "mouse ate cheese too" and "cat ate mouse too"

FIG. 8 is a diagram illustrating a graphical representation 800 of the suffix tree document model for the documents, "cat ate cheese", "mouse ate cheese too", and "cat ate mouse too". A suffix tree of document d is a compact tree containing all suffixes of document d. FIG. 8 is an example of a suffix tree composed from three documents. The nodes of the suffix tree are drawn in circles. Each internal node has at least two children. Each edge is labeled with a non-empty substring of a document called a phrase, and its suffix node is labeled by the phrase too. Then each leaf node in the suffix tree designates a suffix of a document; each internal node represents an overlap phrase shared by at least two suffixes. Generally, the more internal nodes shared by two documents, the more similar the documents tend to be. In FIG. 8, each internal nodes is attached with a box respectively (In the practical implementation, each node including leaf node maintains a list storing the numbers displayed in the box), wherein the numbers in the box designate the documents which have traversed the corresponding node. Each upper number designates a document identifier, the number below designates the number of times a document traversed the node. Conventional suffix tree document model algorithm generally has three logical steps.

Step 1. Common suffix tree generating: A suffix tree S for all suffixes of each document in $D=\{d_1, d_2, \ldots, d_N\}$ is constructed. Each internal node containing at least two different documents is selected to be a base cluster, which is composed of the documents designated by the box, and labeled by the phrase of the node.

Step 2. Base cluster selecting: Each base cluster B is assigned a score s(B), wherein $s(B)=|B|f(|P|)$ and where $|B|$ is the number of documents in B, and $|P|$ is the number of words in P. Then all base clusters are sorted by the scores, and the top k base clusters are selected for cluster merging in Step 3.

Step 3. Cluster merging: A similarity graph consisting of the k base clusters is generated. An edge is added to connect two base clusters $B_i$ and $B_j$ if the Jaccord coefficient of i B and j B is traverses a predetermined value, for example, 0.5

$$\left(\text{e.g., } \frac{|B_i \cap B_j|}{|B_i \cup B_j|} > 0.5\right).$$

The connected components in this graph form the final clusters. For example, the nodes a, b, c, d, e, f are selected to be the base clusters in the suffix tree of FIG. 8.

Further, FIG. 8 can also represent the suffix tree document model that is mapped into a vector model in accordance with the disclosed subject matter. For example, the df of node b is df(b)=3, the tf of the node with respect to document 1 is tf(b,1)=1 (assuming the document identifiers of the three documents to be 1, 2, 3). Therefore we can calculate the weight w(n,d) of node n in document d using, for example, the following tf-idf formula $$tf\text{-}idf(n, d) = (1 + \log(tf(n, d))) \cdot \log\left(1 + \frac{N}{df(n)}\right).$$

After obtaining the term weights of all nodes, it's easy to apply similarity measures, for example, the cosine similarity, $$sim_{cos}(\vec{d_i}, \vec{d_j}) = \frac{\vec{d_i} \cdot \vec{d_j}}{|\vec{d_i}| \times |\vec{d_j}|}$$

to compute the similarity of two documents.

Figure 9:
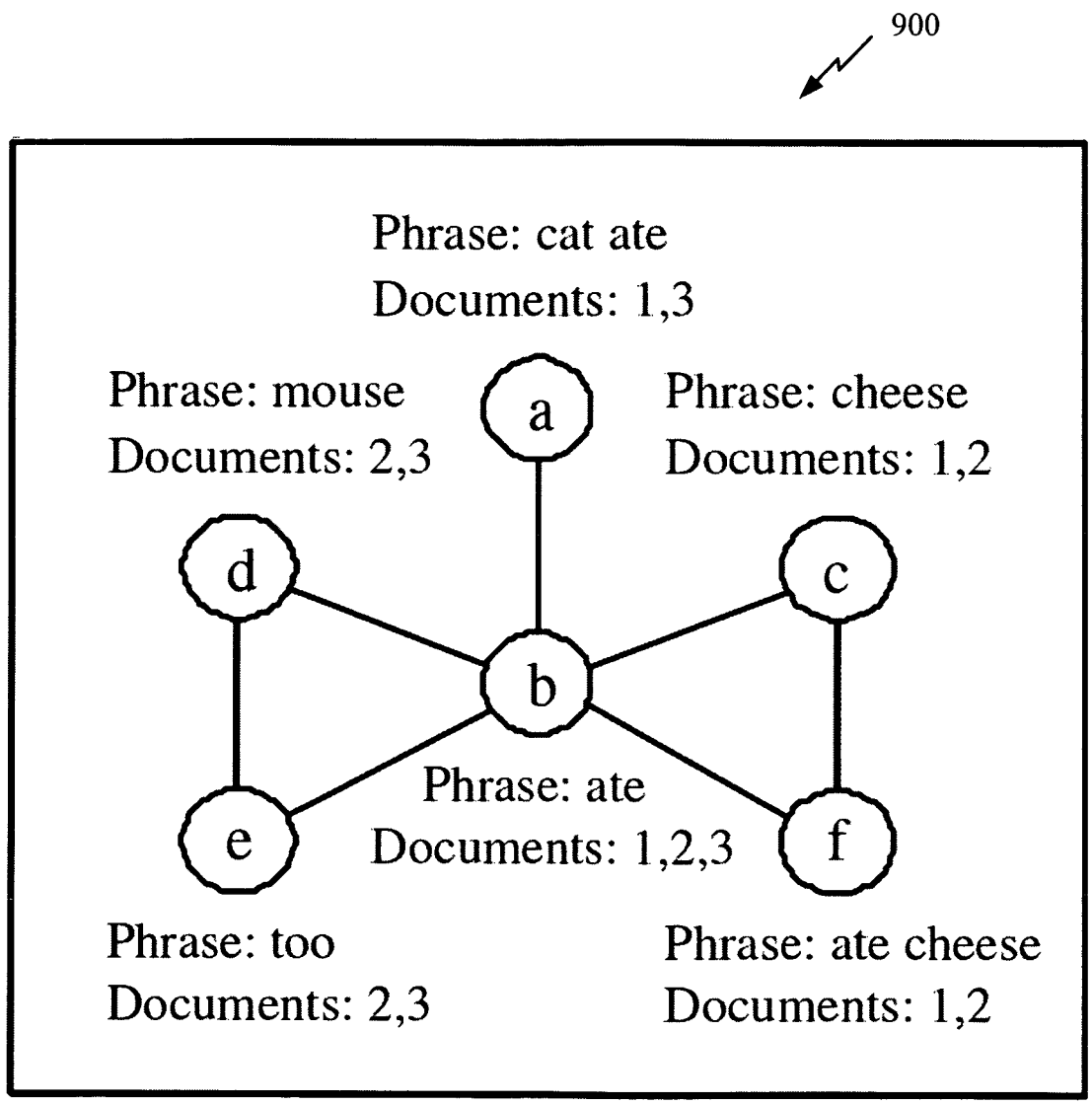
FIG. 9 is a diagram illustrating a base cluster graph from the suffix tree document model for the documents, "cat ate cheese", "mouse ate cheese too" and "cat ate mouse too"

FIG. 9 is a diagram illustrating a base cluster graph 900 from the suffix tree document model for the documents, "cat ate cheese", "mouse ate cheese too", and "cat ate mouse too". FIG. 9 can represent the 6 base clusters from FIG. 8 forming a final cluster as shown in FIG. 9 after cluster merging.

Figure 10:
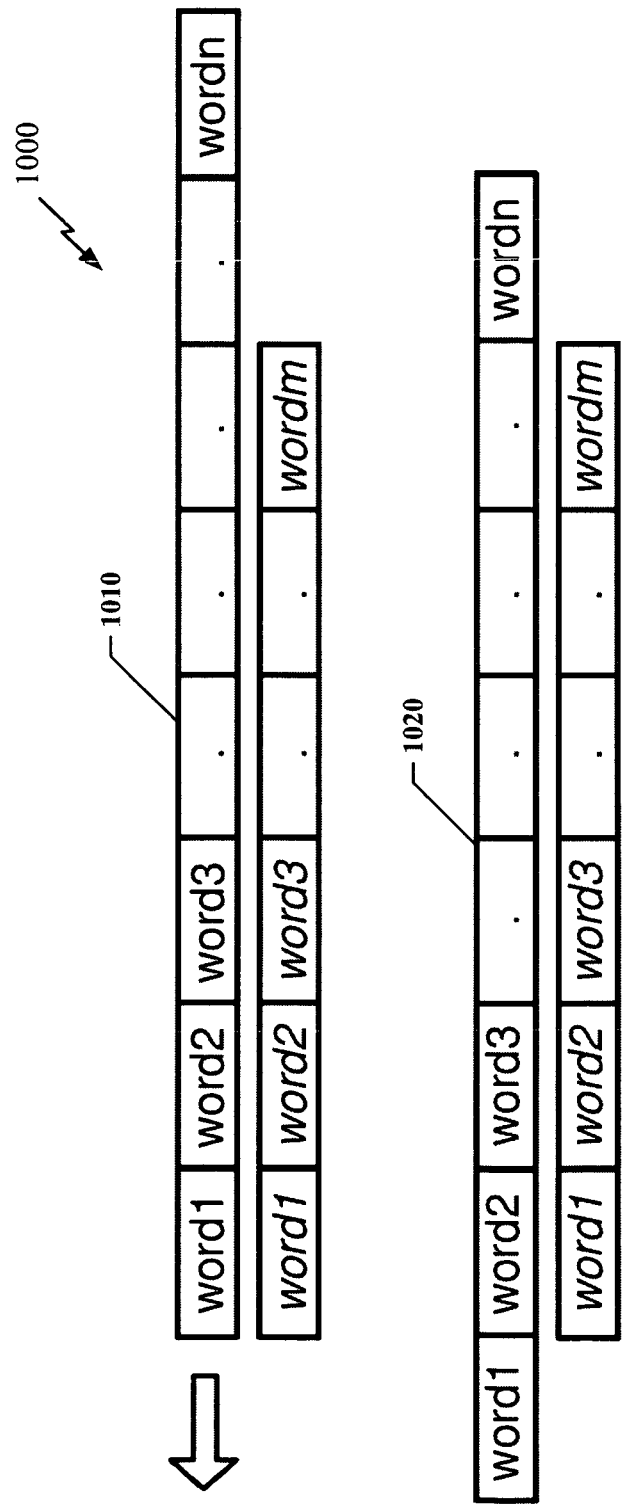
FIG. 10 is a diagram illustrating a graphical representation of a suffix sub-string comparison process between two documents mapped to a vector document model.

FIG. 10 is a diagram illustrating a graphical representation of a suffix sub-string comparison process between two documents mapped to a vector document model.

FIGS. 11-15 are presented as a singular non-limiting detailed example. The entire description with regard to FIGS.

11-15 is not intended to be liming in any way and is provided to illustrate some but not all patentable aspects of the disclosed subject matter. Thus, as a non-limiting example only, the effectiveness of the new suffix tree similarity measure and traditional word term weight (tf-idf) similarity measure in the same GAHC algorithm are illustrated. A conventional suffix tree document model algorithm is compared as well. STC may be used interchangeably with the term suffix tree document model in this example. Similarly, the measure in accordance with the disclosed subject matter is interchangeably referred to as the "NSTC" in the remainder of the example.

The F-Measure score can be employed for evaluating and comparing three clustering algorithms. The F-Measure is commonly used in evaluating the effectiveness of clustering and classification algorithms. It combines the precision and recall ideas from information retrieval: Let $C=\{C_1, C_2, \ldots, C_k\}$ be a clustering of document set D, $C^*=\{C_1^*, C_2^*, \ldots, C_l^*\}$ designate the "correct" class set of D. Then the recall of cluster j with respect to class i, rec(i, j) is defined as $$\frac{|C_j \cap C_i^*|}{|C_i^*|}.$$

The precision of cluster j with respect to class i, prec(i, j) is defined as $$\frac{|C_j \cap C_i^*|}{|C_j|}.$$

The F-Measure combines both values according to, $$F_{i,j} = \frac{2 \cdot prec(i, j) \cdot rec(i, j)}{prec(i, j) + rec(i, j)}.$$

Based on this formula, the F-Measure for overall quality of cluster set C is defined by, $$F := \sum_{i=1}^{l} \frac{|C_i^*|}{|D|} \cdot \max_{j=1, \ldots, k} \{F(i, j)\}.$$

Since there is no original binary or source code for the suffix tree document model algorithm and it is evaluating reference document collections an algorithm following the description in Zamir's paper and PHD thesis is assumed to be provided in this example, the corresponding document collection of OHSUMED is also assumed provided for the example.

The OHSUMED medical abstracts corpus was created to assist information retrieval research. It is a clinically oriented MEDLINE subset consisting of 348,566 references (out of a total of over 7 million), and covers all references from 270 medical journals from 1987 to 1991. Each OHSUMED document has at least one primary and one secondary Medical Subject Heading (MeSH) indexing terms, discriminating between the focused topics and the briefly mentioned topics. All documents of the corpus are used to create the document collection. Only documents having at least one MeSH index term in the "C14-Cardiovascular Diseases (C14)" sub-branch of MeSH hierarchy are selected. The corpus provides a total of 293,856 documents.

A set of disjoint groups of OHSUMED documents, each relating to a specific topic is assumed created. These groups of documents are created as follows. There are 494 index terms under the "C14" term in the MeSH hierarchy. For each term its document group is collected (e.g., each selected OHSUMED document contains this term as a primary index term, but does not contain any index term that has been selected before). Document groups with less than 100 documents are discarded, and also discarded are document groups whose term was an ancestor (in the MeSH hierarchy) of another selected term. In the end, 8 groups of document sets are created, each group with 100 documents. The MeSH index terms are: MSH1058, MSH1262, MSH1473, MSH1486, MSH1713, MSH2025, MSH2030 and MSH2235 as identified by a TREC-9 MeSH topics file, named "query.mesh.1-4904". The document collection that is created has a total of 800 documents, containing 6,281 distinct words after document preprocessing. The average length of the documents is about 110 (by words).

Also generated is a document collection of RCV1 corpus. RCV1 is a corpus that was published by Reuters Corporation for research purposes. It contains 806,792 documents, each consisting of hundreds up to thousands words. The documents have been manually enriched by meta information, for example, category (also called topic), geographic region, or industry sector, among others. RCV1 has 103 different categories, arranged within a hierarchy of four top level categories.

The OHSUMED document collection has 8 disjoint groups of documents already. It is not necessary to build a new document collection under such a strict condition again. The purpose of the new RCV1 document collection is to test the effectiveness of three clustering algorithms in a more complicated situation near to practice.

Ten (10) irrelevant categories are identified. The category index terms are: C11, C12, C21, C41, E11, GREL, GSCI, GSPO, GWEA, and M11. A group of documents with regard to each category of C11, C12, C21, C41, E11, M11 is built, firstly all documents using the index term as their first class term are selected, then 200 documents are randomly chosen from them to form the document group. For documents of categories GREL, GSCI, GSPO, GWEA, because the documents share a same first class term GCAT, 200 documents are randomly selected from all documents whose second class term are the corresponding term for each category. Finally the document collection has 10 groups of documents, containing 19,229 distinct words. The average length of documents is about 150.

Figure 11:
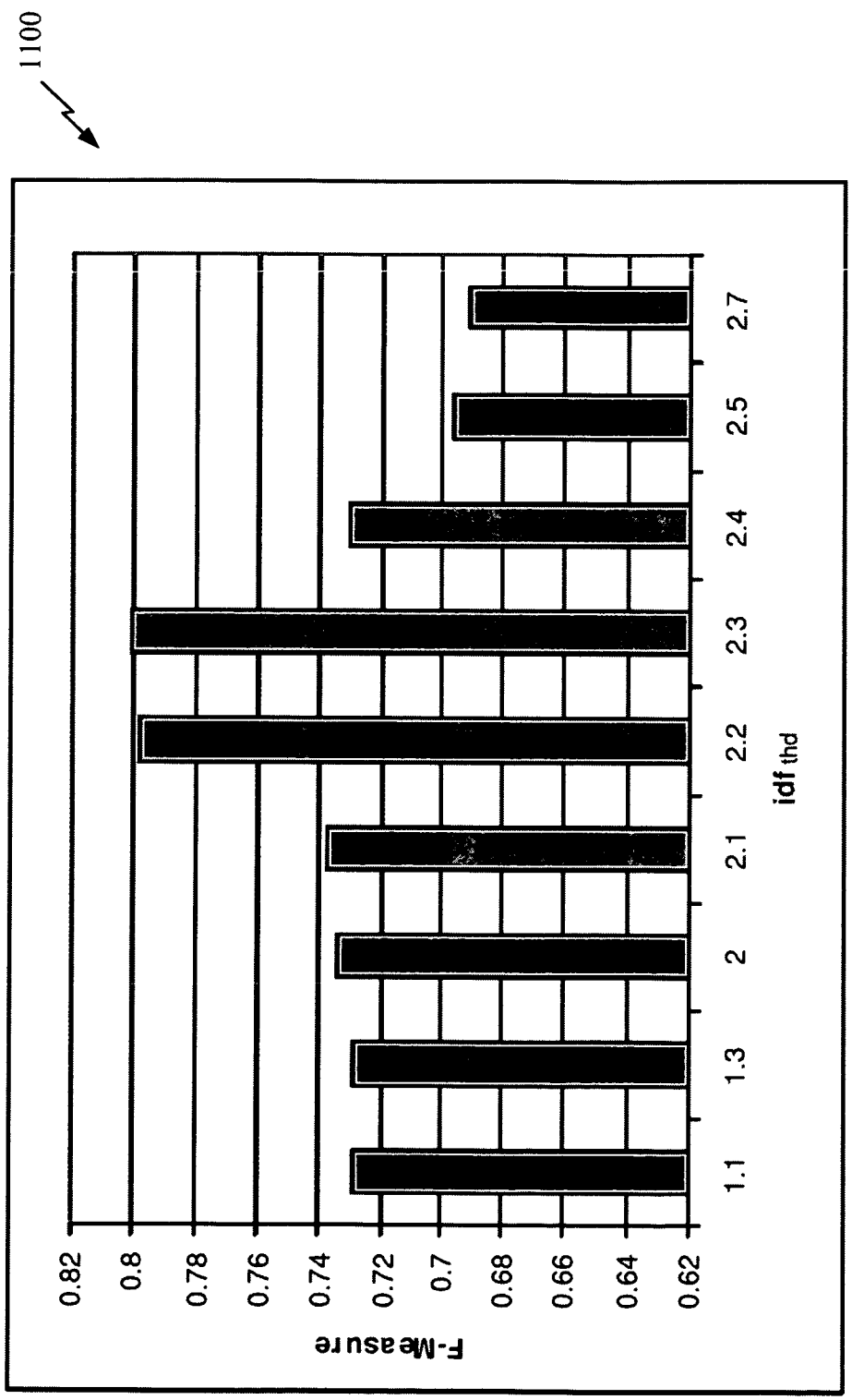
FIG. 11 is a graph illustrating exemplary F-measure scores for different $idf_{thd}$ values.

FIG. 11 is a graph illustrating exemplary F-measure scores for different $idf_{thd}$ values. The conventional suffix tree document model algorithm selects the 500 highest scoring base clusters for further cluster merging, but only the top 10 clusters are selected from the merged clusters as the final clustering result. Thus the GAHC algorithm is allowed to generate 10 clusters in the example to be as fair as possible with comparisons. The total number of clusters generated by the cluster merging in the suffix tree document model is recorded, and the F-measure score is computed for each clustering result respectively. FIG. 11 further shows the effect of threshold $idf_{thd}$ for ignoring the stopnodes in NSTC algorithm, the results are obtained from DS3 document set, which contains all documents of OHSUMED document collection. The F-measure score reaches the top score of 0.801 while $idf_{thd}$ is set to be 2.3.

FIG. 12 illustrates two tables comparing exemplary data, the first table containing exemplary corpus data and the second table containing corresponding exemplary data for F-measure scores for the clustering of 6 document sets. Three document sets are constructed from OHSUMED and RCV1 document collections respectively. The overview of the 6 document sets is illustrated in Table 1 of FIG. 12, where #nodes designates the total number of nodes in the suffix tree generated by the data set, and #overlap nodes designates the number of overlap nodes shared by at least two different documents.

Table 2 of FIG. 12 lists the F-measure scores computed from the clustering results of three clustering algorithms on 6 document sets, where the NSTC designates the results of the new suffix tree similarity measure; TDC designates the results of traditional word tf-idf cosine similarity measure; STC designates the results of all clusters generated by STC algorithm, and STC-10 designates the results of the top 10 clusters generated by original STC algorithm; #clusters designates the amount of clusters generated by STC algorithm for each document set.

Comparing with the results of STC-10, NSTC algorithm has a performance improvement of 80% on the average F-measure scores of 6 document sets. Comparing with results (TDC) of traditional word tf-idf cosine similarity measure with the same GAHC algorithm, NSTC algorithm also achieved an improvement of 51% on the average F-measure scores.

The results of STC also discover a potential improvement in STC algorithm, because STC can obtain quite high F-measure scores (0.68) in the 6 document sets when all final clusters are taken into account. The experimental results indicate the major reason decreasing the effort of STC algorithm— there is no effective measure to evaluate the quality of the clusters during the cluster merging (single-link), eventually the quality of merged clusters cannot be assessed. Thus STC algorithm seldom generated large size clusters with high quality in the experiments. In contrast, NSTC can achieve significant performance improvements with the efficient evaluation measure provided by GAHC algorithm.

Figure 13:
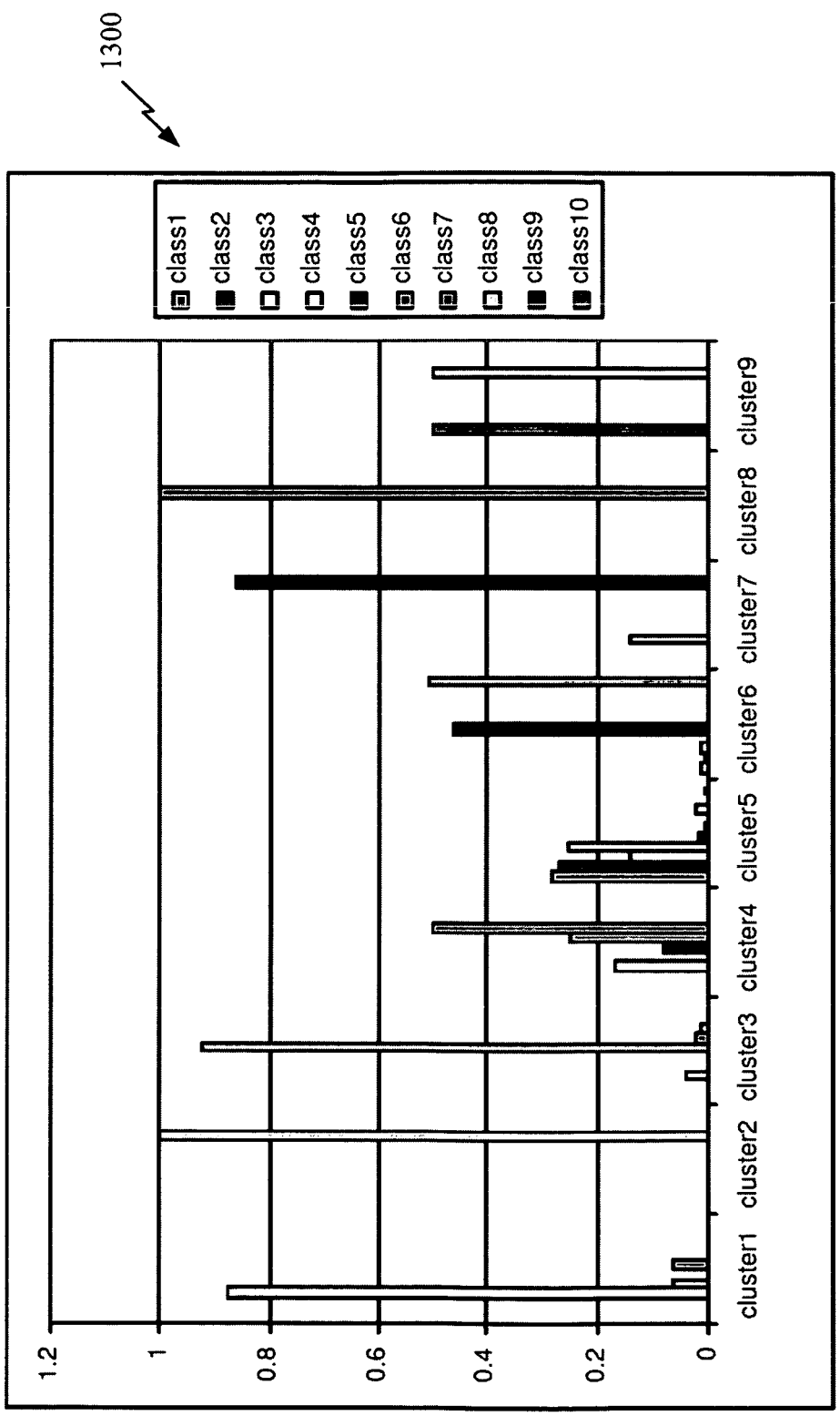
FIGS. 13-15 illustrate exemplary precision scores (FIG. 13), recall scores (FIG. 14), and F-measure scores (FIG. 15) for each cluster in an exemplary result for a DS6 document set.
Figure 14:
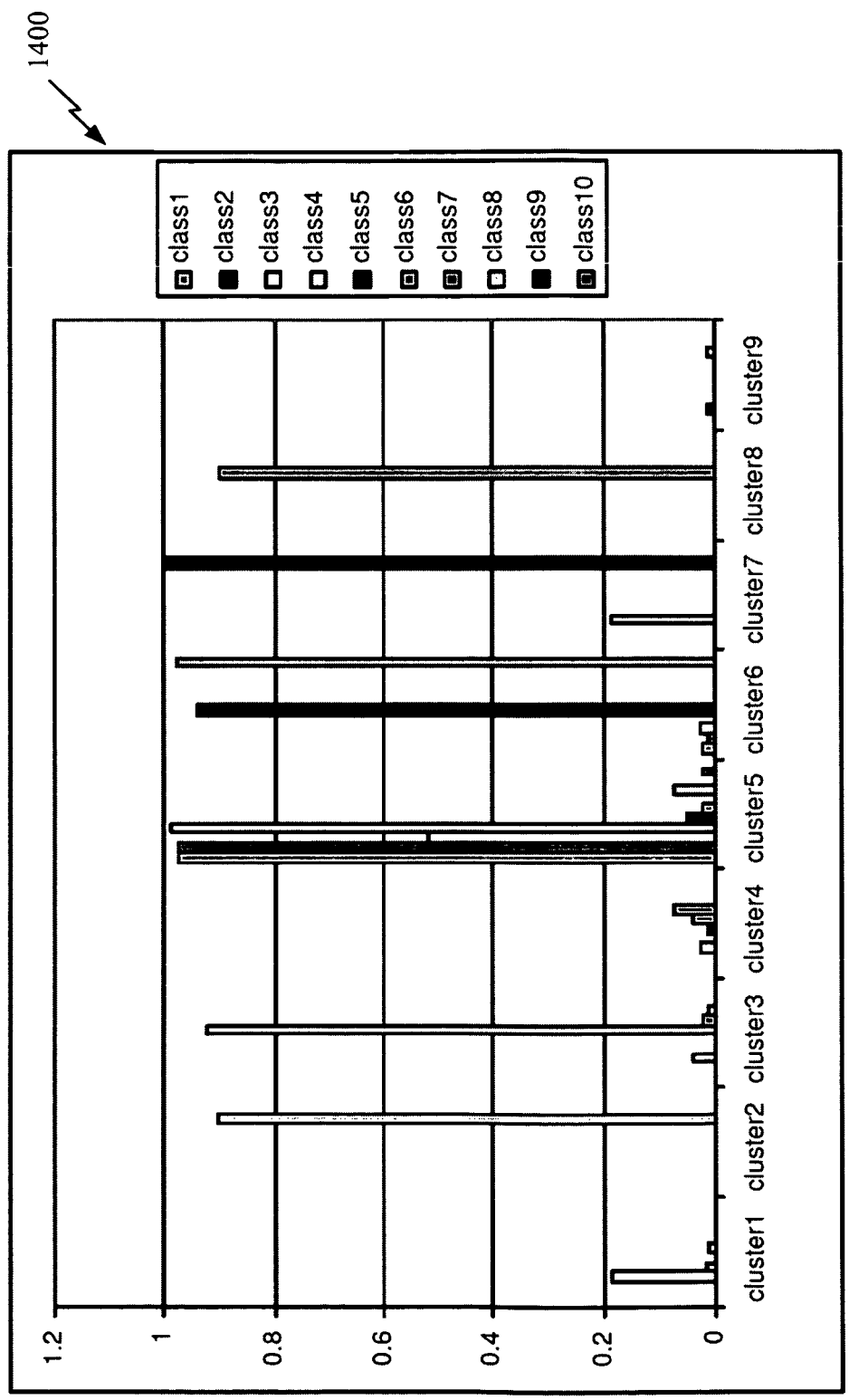
Figure 15:
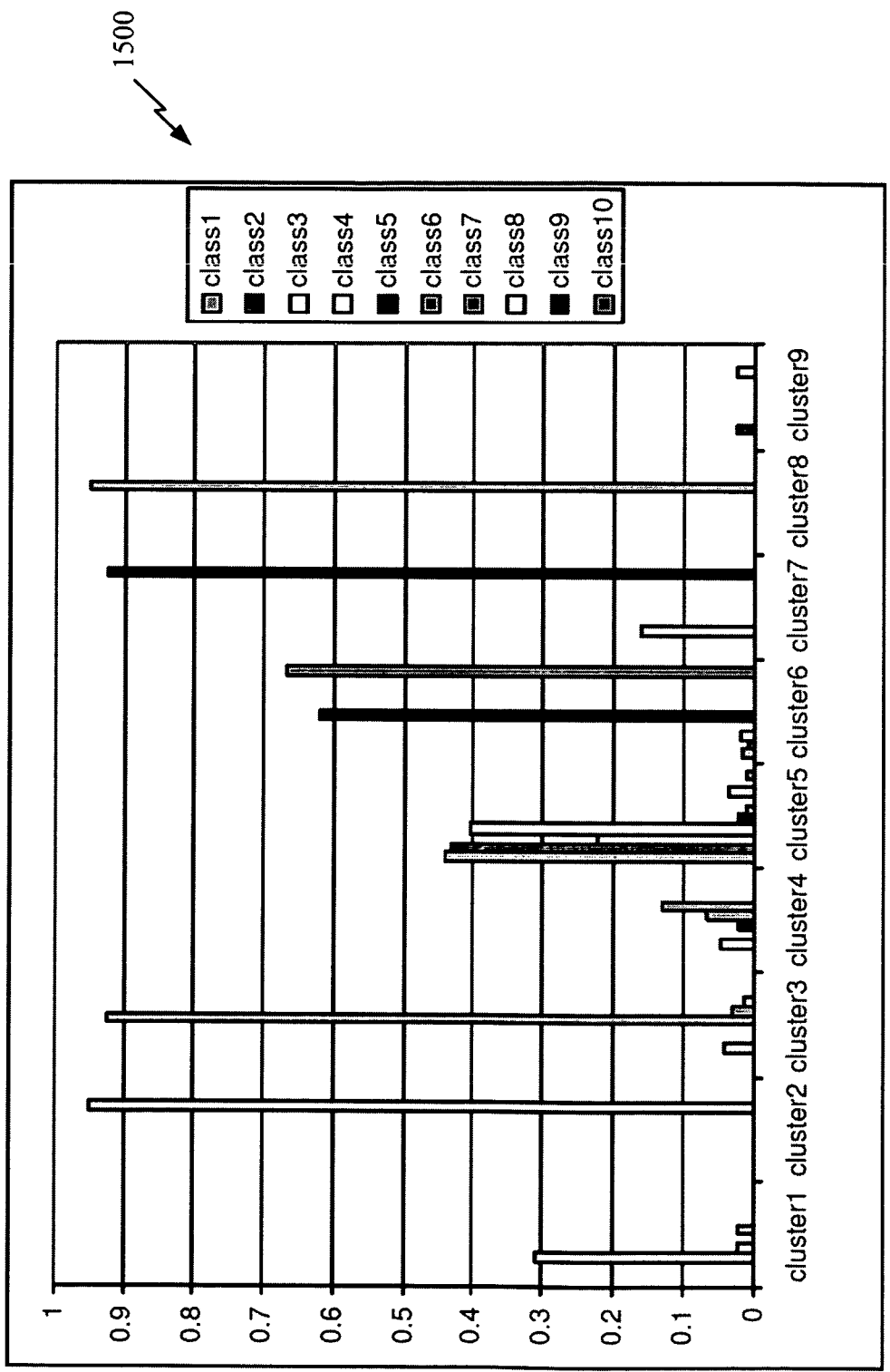

FIGS. 13-15 illustrate exemplary precision scores (FIG. 13), recall scores (FIG. 14), and F-measure scores (FIG. 15) for each cluster in an exemplary result for a DS6 document set. DS6 document set contains all documents of 10 groups in RCV1 document collection. Class1-10 are used to represent the 10 groups respectively. FIGS. 13,14, and 15 respectively illustrate the Precision, Recall, F-measure scores of each cluster in the clustering result of DS6 (there are only 9 non-empty clusters in the result). It's easy to find that, the 5th cluster is composed of the documents of 3 classes, namely class1, class2, class4 (C11, C12, C41). The cluster shows that some intersections possibly appear among the documents of the 3 classes. In fact, the method that is used to build RCV1 document collection just ensures the first or second class term of the documents to be disjointed. It is possible that the documents in different classes share a same second or third class term of the corpus category index. The average F-measure scores that are obtained in DS4, DS5, DS6 is 0.783, which is very close to the average F-measure scores of 0.78 achieved by other researchers.

FIG. 16 illustrates an exemplary topic summary result from two categories of a WWW document clustering process. More specifically, FIG. 16 captures a snapshot from a clustering result of the WWW document clustering algorithm as presented herein. It demonstrates the Topic Summary and the exemplary top 5 threads' subject title of two categories. The post data in the experiment is from the Apple discussion community (discussions.apple.com). It's a commercial technical support forum for the products of Apple Company. 500 threads are chosen in the forum "iPOD with color display—Connecting to Windows" for this experiment. A Web crawler was written to automatically download the Web pages of the online forum community in November 2005, all these Web pages were parsed into posts and stored in several tables.

Figure 17:
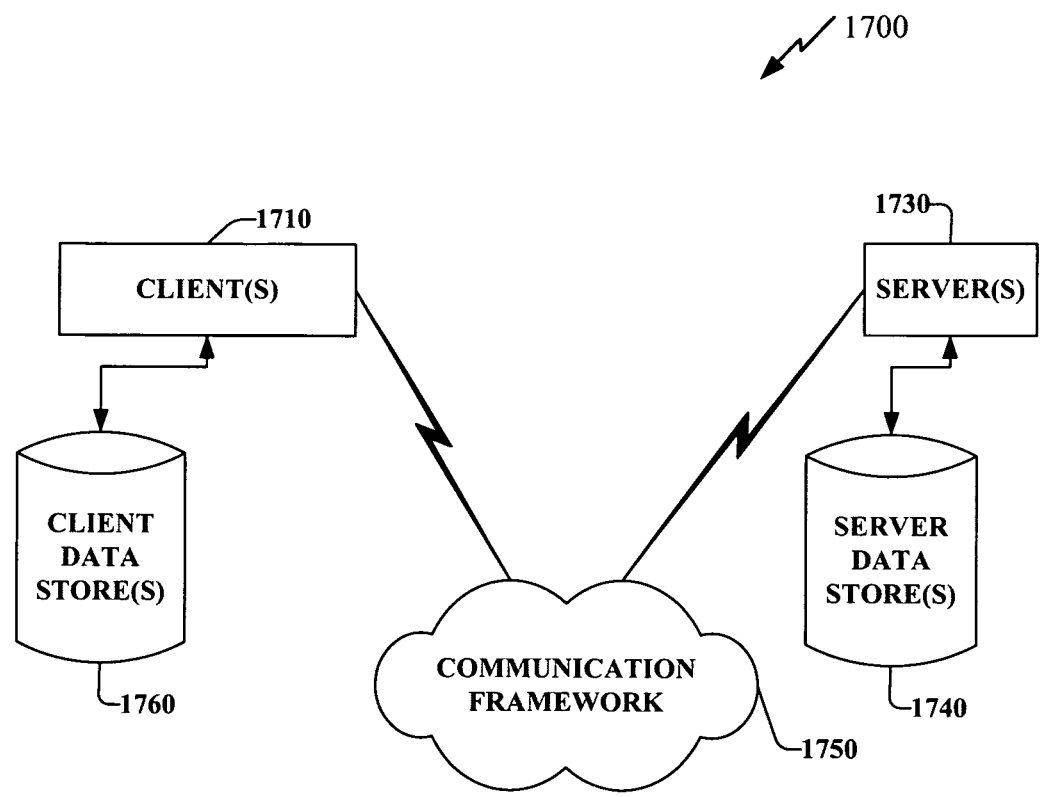
FIG. 17 is a high level illustration of a distributed system facilitating weighted suffix tree document clustering in accordance with the subject innovation.

FIG. 17 is a high level illustration of a distributed system facilitating weighted suffix tree document clustering in accordance with the subject innovation. The system 1700 includes one or more client(s) 1710. The client(s) 1710 can be hardware and/or software (e.g., threads, processes, computing devices). The system 1700 also includes one or more server(s) 1730. The server(s) 1730 can be hardware and/or software (e.g., threads, processes, computing devices). The servers 1730 can house threads or processes to perform transformations by employing the subject innovation, for example.

One possible means of communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

Figure 18:
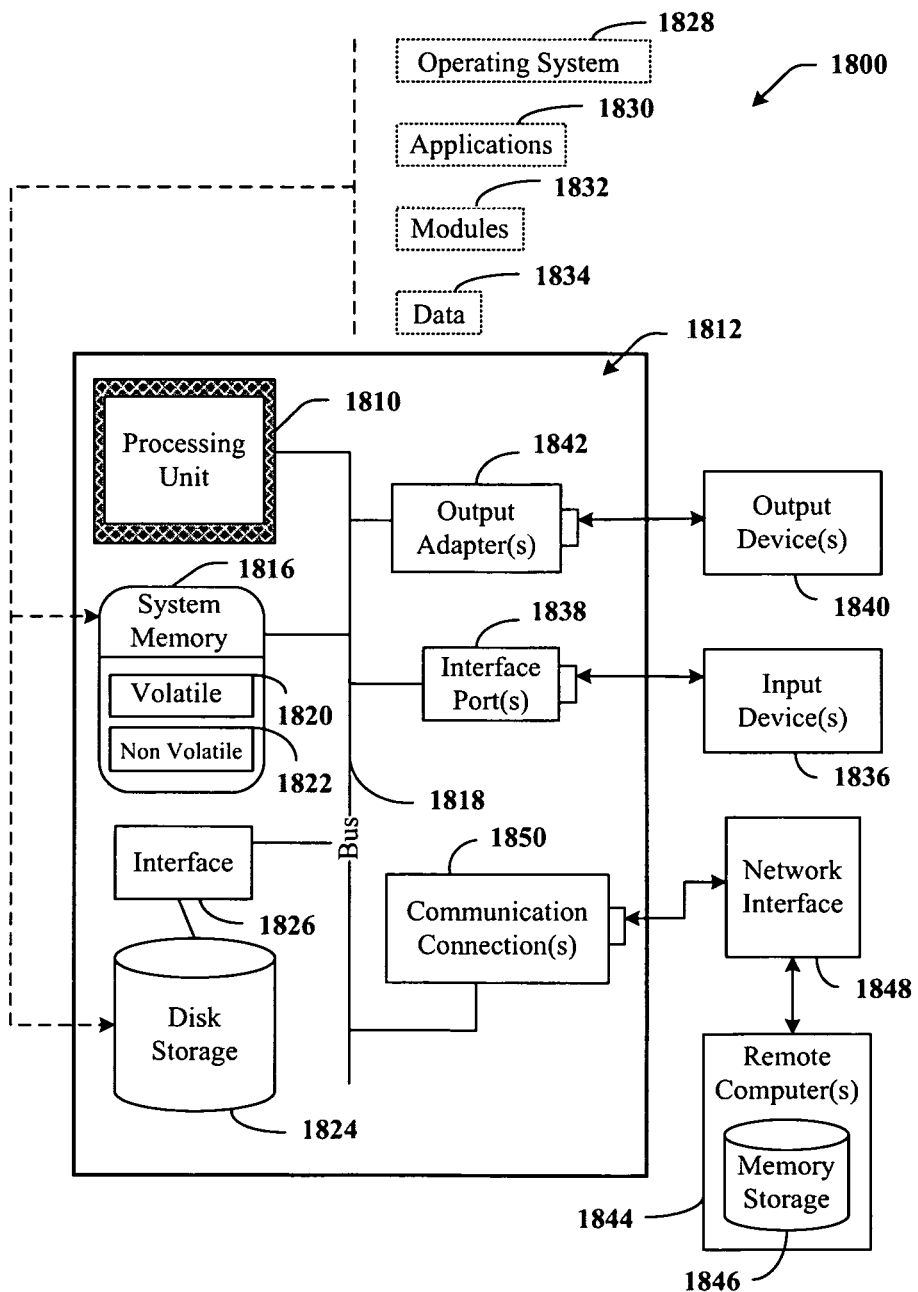
FIG. 18 is an illustration of an exemplary computing environment facilitating weighted suffix tree document clustering in accordance with the subject innovation.

With reference to FIG. 18, illustrated is an exemplary environment 1800 for implementing various aspects of the innovation includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/nonvolatile computer storage media. For example, FIG. 18 illustrates a disk storage 1824. The disk storage 1824 includes, but is not limited to, devices like a magnetic disk drive, floppy disk drive, tape drive, Jaz drive, Zip drive, LS drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in the suitable operating environment 1800. Such software includes an operating system 1828. The operating system 1828, which can be stored on the disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the subject innovation can be implemented with various operating systems or combinations of operating systems.

A user enters commands or information into the computer 1812 through input device(s) 1836. The input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the subject innovation, but one of ordinary skill in the art may recognize that many further combinations and permutations of the subject innovation are possible. Accordingly, the subject innovation is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the innovation. In this regard, it will also be recognized that the innovation includes a system as well as a computerreadable medium having computer-executable instructions for performing the acts and/or events of the various methods of the innovation.

In addition, while a particular feature of the innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   at least one memory having stored therein computer executable instructions; and
   a processor, coupled to the at least one memory, configured to execute or facilitate execution of the computer executable instructions to at least:
   create a suffix tree document model that is a representation of a plurality of documents;
   convert the suffix tree document model into a vector document model that is a representation of a document of the plurality of documents to form the suffix tree document model converted into the vector document model, wherein the vector document model is a vector with M elements and M is a total number of nodes in the suffix tree document model;
   weight elements of the suffix tree document model converted into the vector document model; and
   determine a similarity between two or more weighted vector document models, each representing a respective document of the plurality of documents.

2. The system of claim 1, wherein the processor and memory are distributed across at least two network devices.

3. The system of claim 1, wherein the elements of the suffix tree document model converted into the vector document model are weighted based on a term frequency of a corresponding suffix tree node, wherein the term frequency of the corresponding suffix tree node with respect to the document is a total number of times the document traverses the corresponding suffix tree node.

4. The system of claim 1, wherein the elements of the suffix tree document model converted into the vector document model are weighted based on an inverse document frequency of a corresponding suffix tree node, and the inverse document frequency of the corresponding suffix tree node is a number of different documents that have traversed the corresponding suffix tree node.

5. The system of claim 1, wherein the processor is further configured to execute or facilitate the execution of the computer executable instructions to determine the similarity using a cosine similarity function.

6. The system of claim 1, wherein the processor is further configured to execute or facilitate the execution of the computer executable instructions to populate the suffix tree document model or clean data for conversion.

7. The system of claim 1, wherein the processor is further configured to execute or facilitate the execution of the computer executable instructions to:
generate stopnodes, wherein a threshold of an inverse document frequency is determinative of whether a node is a stopnode of the stopnodes,
generate cluster topics based at least in part on information related to unconverted data information, and
determine a quality of the cluster topics based at least in part on the unconverted data information.

8. The system of claim 7, wherein the processor is further configured to execute or facilitate the execution of the computer executable instructions to retain term information in a subset of branches of the suffix tree document model that relates to one or more stop words that are removed in phrases represented by the branches of the suffix tree document model.

9. A method, comprising:
creating, by a device comprising a processor, a suffix tree document model for a plurality of documents received from an online forum system;
after the creating the suffix tree document model, generating the suffix tree document model into vector document models representing respective ones of the plurality of documents, wherein the vector document models are vectors with M elements, and M is a total number of nodes in the suffix tree document model;
weighting elements of the vector document models generated from the suffix tree document model to generate weighted elements;
based on the weighted elements, determining a similarity between weighted vector document models, representing respective documents from the plurality of documents;
forming a plurality of clusters according to the similarity between the weighted vector documents models by using group agglomerative hierarchical clustering; and
generating respective cluster topic summaries for the plurality of clusters.

10. The method of claim 9, wherein the weighting the elements includes weighting according to the formula:

$$tf\text{-}idf(n, d) = (1 + \log(tf(n, d))) \cdot \log\left(1 + \frac{N}{df(n)}\right)$$

where N is the number of distinct documents d comprising a document set D wherein $D = \{d_1, d_2, \ldots, d_N\}$, $tf(\bullet)$ is a term frequency, and $idf(\bullet)$ is an inverse document frequency.

11. The method of claim 9, wherein the determining the similarity includes determining the similarity based on a cosine similarity function.

12. The method of claim 9, further comprising:
collecting a topic thread in an online forum of the online forum system, wherein the topic thread comprises a topic post and a plurality of reply posts;
stripping non-word tokens of the topic post and the plurality of reply posts;
parsing remaining texts of the topic post and the plurality of reply posts into words of parsed posts;
identifying and removing stop words in the parsed posts from the parsing;
applying Porter stemming to the parsed posts to generate stemmed posts having stemmed words;
combining the stemmed words into objects including selecting a subject of the topic thread as a title of the plurality of documents,
combining text of the stemmed posts into the plurality of documents in order of respective submitted times; and
merging the objects with at least a predetermined number of words into a document that facilitates populating the suffix tree document model.

13. The method of claim 12, further comprising:
creating stopnodes in the suffix tree document model to retain at least a part of information related to the stop words.

14. The method of claim 9, further comprising at least one of cleaning the data before forming the suffix tree document model of the data to generate clean data, merging the clean data into an object for populating the suffix tree document model, and populating the suffix tree document model prior to the generating the suffix tree document model to a vector document model.

15. The method of claim 9, further comprising at least one of:
determining a quality score for generating cluster topics based at least in part on information related to unmapped data information, selecting a first subset of documents based at least in part on the quality score, selecting and sorting a subset of nodes traversed by a first subset of documents based at least in part on the quality score by a predetermined metric, and labeling a cluster based at least in part on a calculation depending on a quality measure determination.

16. The method of claim 9, wherein the weighting the elements includes determining the weighted elements as a function of a term frequency and a document frequency of a suffix tree node.

17. A non-transitory computer readable medium comprising computer executable instructions that, in response to execution, cause a system comprising a processor to perform operations, comprising:
creating a suffix tree document model that represents a plurality of documents;
translating the suffix tree document model representing the plurality of documents into a vector document model that represents one of the plurality of documents to generate a translation of the vector document model from the suffix tree document model, wherein the vector document model is a vector with M elements, and M is a total number of nodes in the suffix tree document model;

weighting elements of the translation of the vector document model to generate weighted vector document models comprising weighted elements; and determining a similarity between at least two weighted vector models of the weighted vector document models, each representing a respective document from the plurality of documents, based on the weighted elements.

18. The non-transitory computer readable medium of claim 17, wherein the operations further comprise determining vector factor weights corresponding to each of the elements of the vector document model as a function of a term frequency and a document frequency of a suffix tree node.

19. The system of claim 18, wherein the processor is further configured to execute or facilitate the execution of the computer executable instructions to determine a longest common prefix in the suffix tree document model to compare sub-strings between vector terms.

20. The system of claim 19, wherein the processor is further configured to execute or facilitate the execution of the computer executable instructions to determine weight factors for vector terms of the vector document model and incorporate the longest common prefix in a determination of at least one of the vector factor weights.

* * * * *